United States Patent
Yoshida et al.

(10) Patent No.: US 8,980,428 B2
(45) Date of Patent: Mar. 17, 2015

(54) POROUS SILICON PARTICLES AND COMPLEX POROUS SILICON PARTICLES, AND METHOD FOR PRODUCING BOTH

(71) Applicants: Furukawa Electric Co., Ltd., Chiyoda-ku, Tokyo (JP); Tohoku Techno Arch Co., Ltd., Sendai-shi, Miyagi (JP)

(72) Inventors: Hirokazu Yoshida, Tokyo (JP); Kazutomi Miyoshi, Tokyo (JP); Kazuhiko Kurusu, Tokyo (JP); Toshio Tani, Tokyo (JP); Koji Hataya, Tokyo (JP); Takeshi Nishimura, Tokyo (JP); Hidemi Kato, Tokyo (JP); Takeshi Wada, Tokyo (JP)

(73) Assignees: Furukawa Electric Co., Ltd., Tokyo (JP); Tohoku Techno Arch Co., Ltd., Miyagi (JP)

( * ) Notice: Subject to any disclaimer, the term of this patent is extended or adjusted under 35 U.S.C. 154(b) by 0 days.

(21) Appl. No.: 13/797,326

(22) Filed: Mar. 12, 2013

(65) Prior Publication Data

US 2013/0196158 A1 Aug. 1, 2013

Related U.S. Application Data

(63) Continuation of application No. PCT/JP2011/071214, filed on Sep. 16, 2011.

(30) Foreign Application Priority Data

| Sep. 17, 2010 | (JP) | 2010-209665 |
| Sep. 17, 2010 | (JP) | 2010-209691 |
| Sep. 8, 2011 | (JP) | 2011-195723 |
| Sep. 8, 2011 | (JP) | 2011-195751 |

(51) Int. Cl.
*H01M 4/04* (2006.01)
*H01M 4/36* (2006.01)
*H01M 4/38* (2006.01)

(52) U.S. Cl.
CPC ............ *H01M 4/0495* (2013.01); *H01M 4/364* (2013.01); *H01M 4/386* (2013.01); *Y10T 428/2982* (2015.01)
USPC .......... 428/402; 428/403; 428/404; 428/34.4; 423/324

(58) Field of Classification Search
USPC .................. 428/402, 403, 34.4, 404; 423/324
IPC .......................................... H01M 4/0495,4/386
See application file for complete search history.

(56) References Cited

U.S. PATENT DOCUMENTS

2006/0251561 A1* 11/2006 Farrell et al. .................. 423/324
2009/0186267 A1 7/2009 Tiegs

FOREIGN PATENT DOCUMENTS

| CN | 1212989 A | 4/1999 |
| CN | 1542498 A | 11/2004 |
| JP | 6144825 A | 5/1994 |
| JP | 6191820 A | 7/1994 |
| JP | 1111925 A | 1/1999 |
| JP | 2000149937 A | 5/2000 |
| JP | 2004362895 A | 12/2004 |
| JP | 3827642 B2 | 9/2006 |
| JP | 2006260886 A | 9/2006 |
| JP | 2008135364 A | 6/2008 |
| JP | 4172443 B2 | 10/2008 |
| JP | 200932644 A | 2/2009 |
| JP | 2010501970 A | 1/2010 |
| WO | 2005007938 A1 | 1/2005 |

OTHER PUBLICATIONS

International Search Report mailed Dec. 20, 2011, corresponds to PCT/JP2011/071214.
Office Action dated Jul. 2, 2014, corresponds to Chinese patent application No. 201180044169.1.

* cited by examiner

*Primary Examiner* — Leszek Kiliman
(74) *Attorney, Agent, or Firm* — Lowe Hauptman & Ham, LLP

(57) ABSTRACT

Porous silicon particles and complex porous silicon particles suitable for negative electrode materials etc. for lithium-ion batteries, which achieve high capacity and good cycling characteristics, are provided. Porous silicon particles formed by the joining of a plurality of silicon microparticles, and having an average particle diameter of 0.1 μm to 1000 μm, a three-dimensional network structure having continuous gaps, an average porosity of 15 to 93%, and a structure in which the particles of a whole particle are uniform. Complex porous silicon particles formed by the joining of a plurality of silicon microparticles and a plurality of silicon compound particles, and characterized by containing a compound of silicon and composite elements, having an average particle diameter of 0.1 μm to 1000 μm, and having a three-dimensional network structure having continuous gaps.

9 Claims, 18 Drawing Sheets

(a)

(b)

(c)

(a)

(b)

(a)

(b)

(a)

(b)

(c)

POROUS SILICON PARTICLES AND COMPLEX POROUS SILICON PARTICLES, AND METHOD FOR PRODUCING BOTH

RELATED APPLICATIONS

The present application is a continuation of International Application Number PCT/JP2011/071214, filed Sep. 16, 2011, and claims priority from, Japanese Application Number 2010-209691, filed Sep. 17, 2010, Japanese Application Number 2010-209665, filed Sep. 17, 2010, Japanese Application Number 2011-195751, filed Sep. 8, 2011, Japanese Application Number 2011-195723, filed Sep. 8, 2011, the disclosure of which is hereby incorporated by reference herein in its entirety.

TECHNICAL FIELD

The present invention relates to the porous silicon particles and complex porous silicon particles that are used for the negative electrode for lithium-ion batteries, etc.

BACKGROUND ART

Conventionally, the lithium-ion battery using various carbon system materials, such as natural graphite, artificial graphite, amorphous carbon and mesophase carbon, and lithium titanate, a tin alloy, etc. as a negative electrode active material is put in practical use. Kneading a negative electrode active material, electrically conductive auxiliary agents, such as carbon black and the binder of resin, then preparing slurry, applying and drying on copper foil, and forming a negative electrode is performed.

On the other hand, aiming at high capacity, a negative electrode for lithium-ion batteries using a metal and an alloy with big theoretical capacity as a lithium compound, especially silicon and its alloy, as a negative electrode active material is developed. However, since the volume of the silicon which carried out occlusion of lithium ion expands up to about 4 times to the silicon before occlusion, the negative electrode using silicon as a negative electrode active material repeats expansion and contraction at the time of a charge-and-discharge cycle. Therefore, exfoliation of a negative electrode active material occurred and there was a problem that it was very short life, as compared with the negative electrode which consists of the conventional carbon system active material.

As a conventional manufacturing method of the negative electrode which uses silicon, the technique mechanically grinding silicon to several micro meter size, applying it with a conductive material and using it as a negative electrode material for lithium batteries is known (see the patent document 1).

As other conventional manufacturing methods of the negative electrode which uses silicon, there are a method of anodizing a silicon substrate and forming slots, such as a slit, a method of making minute silicon crystallize in the ribbon shaped bulk metal etc. (see the patent document 2).

Otherwise, the technique depositing the particles of polymers, such as polystyrene and PMMA, on a conductive substrate, and giving metal which can alloy with lithium by plating, removing the particles of polymers and then producing a porous object (porous body) of metal is known (see the patent document 3).

The technique which uses the thing equivalent to Si intermediate alloy which is an intermediate product of the present invention as a negative electrode material for lithium batteries is known (see the patent documents 4 and 5).

The technique which uses the thing produced by heat-treating this as a negative electrode material for lithium batteries is known (see the patent document 6).

In relation to this technique, the technique which elutes and removes element M completely by acid or alkali from Si alloy of Si and element M, which is produced by applying rapid solidification technique is known (see the patent document 7).

The technique which etches metallic silicon with fluoric acid and nitric acid is also known (for example, patent documents 8 and 9).

RELATED DOCUMENTS

Patent Document

[Patent document 1] JP, 4172443, B
[Patent document 2] JP, 2008-135364, A
[Patent document 3] JP, 2006-260886, A
[Patent document 4] JP, 2000-149937, A
[Patent document 5] JP, 2004-362895, A
[Patent document 6] JP, 2009-032644, A
[Patent document 7] JP, 3827642,B
[Patent document 8] US, 2006/0251561, A
[Patent document 9] US 2009/0186267, A

SUMMARY OF THE INVENTION

Technical Problem

However, in the technique of patent document 1, a plate or a powder which is a single crystal of several micrometer size produced by grinding single crystal silicon, and whose silicon atom is stratified or has three-dimensional meshes-of-a-net structure is used as an active material for negative electrodes. In order to give conductivity, a silicon compound (more than one kind of the silicon compound groups which consist of silicon carbide, silicon cyanide, silicon nitride, silicon oxide, silicon boride, silicon borate, silicon boron nitride, silicon oxynitride, silicon alkaline metal alloy, silicon alkaline earth metal alloy, and silicon transition metal alloy) is used. However, because the volume change at the time of the charge and discharge of silicon is large, during the charge and discharge of a negative electrode active material described in patent document 1, the pulverization of the negative electrode active material, the exfoliation of the negative electrode active material, the crack initiation of the negative electrode, and the fall of conductivity between the negative electrode active materials, etc. occur, and capacity falls. Therefore, there was a problem that cycling characteristics were bad and the life of a rechargeable battery was short. Since especially the silicon in which the utilization as a negative electrode material is expected had the large volume change at the time of charge and discharge, it was easy to cause a crack and there was a problem that a charge-discharge cycle characteristic was bad.

Moreover, in the technique of patent document 2, the slurry of a negative electrode active material, an electrically conductive auxiliary agent and a binder is applied and dried, and a negative electrode are formed. In such a conventional negative electrode, the negative electrode active material and the current collector are bound with the resin binder with low conductivity, and the amount of the resin needs to be controlled to the minimum so that internal resistance may not become large, and its binding strength is weak. Since the volume change of silicon at the time of charge and discharge is large, in the technique of patent document 2, the pulverization of the negative electrode active material, exfoliation of the negative electrode active material, the crack initiation of the negative electrode, and the fall of conductivity between the negative electrode active materials, etc. occur in a negative electrode active material during the charge and discharge, and capacity falls. Therefore, there was a problem that cycling characteristics were bad and the life of a rechargeable battery was short.

The technique of patent document 3 can produce a porous object (porous body) of metal by depositing the particles of polymers, such as polystyrene and PMMA, on a conductive substrate, giving metal which can alloy with lithium by plating, and removing the particles of polymers. However, when producing the porous object of Si, there was a problem that it was very difficult to plate Si to the particles of polymers, such as polystyrene and PMMA, and this technique could not be industrially adapted.

The technique of patent document 4 is manufacturing method of negative electrode material for nonaqueous electrolyte rechargeable batteries characterized by including the process of cooling and solidifying the molten material which constitute alloy particles so that solidification speed may be more than 100 degrees Celsius/sec, and forming an alloy containing Si phase particle, and the phase of Si content solid solution or an intermetallic compound which surrounds this partially at least. However, by this method, when Li reacts, since it is required to carry out spreading diffusion in the Si content solid solution to surround, and it lacks reactivity and also there is little content of Si which can contribute to charge and discharge, it has not resulted in utilization.

The technique of patent document 5 is constituted by the silicon base alloy powder containing silicon (content of silicon is more than 22 mass % below 60 mass %), and any one, two or more kinds of metallic elements of copper, nickel, and cobalt. By composing this by the single rolling method or the atomizing method, the pulverization based on the volume change by the occlusion and discharge of a lithium ion etc. is controlled. However, by this method, when Li reacts, since it is required to carry out spreading diffusion in the Si content solid solution to surround, and it lacks reactivity and also there is little content of Si which can contribute to charge and discharge, it has not resulted in utilization.

The technique of patent document 6 includes the process of rapidly cooling molten metal alloy containing Si and one, two or more kinds of elements chosen from Co, Ni, Ag, Sn, Al, Fe, Zr, Cr, Cu, P, Bi, V, Mn, Nb, Mo, In, and a rare earth element, and obtaining Si basis amorphous alloy, and the process of heat-treating obtained Si basis amorphous alloy. By heat-treating Si basis amorphous alloy, minute crystalline Si core (about tens of nm to 300 nm) is deposited. However, by this method, when Li reacts, since it is required to carry out spreading diffusion in the Si content solid solution to surround, and it lacks reactivity and also there is little content of Si which can contribute to charge and discharge, it has not resulted in utilization.

The technique of patent document 7 is adapted when manufacturing an amorphous ribbon, fine powder, etc., and it is solidified at a cooling rate mainly above $10^4$K/second. In the common solidification of alloy, the dendrite crystal in which a secondary dendrite grows while a primary dendrite grows is obtained. An amorphous metal can be obtained in special alloy systems (a Cu—Mg system, a nickel-Ti system, etc.) above $10^4$ K/second. However, in other systems (for example, Si-nickel system), even if it is solidified at a cooling rate mainly above $10^4$K/second, an amorphous metal cannot be obtained, but a crystal phase is formed. The size of a crystal in case crystal phase is formed is conformed in a cooling rate (R: K/second) and the relation of dendrite arm spacing (DAS: micrometer).

$$DAS = A \times R^B \text{ (generally } A: 40 \text{ to } 100, B: -0.3 \text{ to } -0.4)$$

Therefore, when it has a crystal phase, in the case of A: 60 and B:−0.35, DAS becomes with 1 micrometer in R: $10^4$K/second, for example. A crystal phase also applies to this size and minute crystal phases, such as 10 nm, cannot be obtained. From these reasons, the porous body which consists of a minute crystal phase cannot be acquired only by this rapid solidification technical, with materials, such as a Si—Ni system.

The technique of patent documents 8 and 9 etches metal silicon using fluoric acid or nitric acid, and creates minute holes in the surface. However, there was a problem that BET specific surface area of 140 to 400 $m^2$/g was insufficient as an active material for Si negative electrodes from a viewpoint of the response of charge and discharge. However, the hole formed by etching tends to be hard to form toward the inside of particles, as a result a hole does not exist uniformly from a particle surface to a center, and a big and rough silicon grain is formed near a particle center. Therefore, with the cubical expansion and contraction at the time of charge and discharge, the pulverization progressed inside particles and there was a problem that it was short-life.

The present invention's having been made in view of the problem mentioned above, and the purpose is obtaining the suitable porous silicon particle and complex porous silicon particle for negative electrode material etc. for the lithium-ion batteries which realize high capacity and good cycling characteristics.

Means for Solving the Problem

As a result of studying eagerly to achieve the above mentioned purpose, inventors found out that minute porosity silicon was obtained by spinodal decomposition (deposit of silicon within a molten metal from a silicon alloy) and dealloying of a silicon alloy. Because a deposit of silicon within a molten metal from a silicon alloy is performed in a hot melting metal, it is hard to cause big distribution in a diameter of a primary particle, or percentage of void between a layer part and inside of porous silicon particle which were obtained by the dealloying. On the other hand, in etching by acid, because restrictions may occur in concentration diffusion of a dealloying element in an inside of a particle, a ratio of a pore of a particle layer part becomes large, and a ratio of a pore inside particles becomes small. Depending on conditions, a core of Si which does not have a pore remains in the particle center, this coarse Si of the center, is pulverized at the time of a reaction with Li, and cycling characteristics are inferior. The present invention is made based on this knowledge.

Hence, the following inventions are provides the following inventions (1) A porous silicon particle comprises two or more silicon microparticles that are joined together, wherein an average particle diameter of said porous silicon particle is 0.1 micrometers to 1000 micrometers; said porous silicon particle has a three-dimensional network structure having a continuous void; an average porosity of said porous silicon particle is 15 to 93%; Xs/Xi which is a ratio of a porosity Xs of a surface neighborhood domain of more than 50% of a radial direction to a porosity Xi of a particle interior domain of less than 50% of a radial direction is 0.5 to 1.5; and silicon is included more than 80 atomic % in a ratio of elements except oxygen.

(2) The porous silicon particle according to (1), wherein an average particle diameter or an average pillar diameter of said silicon microparticles is 2 nm to 2 micrometers; Ds/Di which is a ratio of average particle diameter Ds of said silicon microparticles in a surface neighborhood domain of more than 50% of a radial direction to an average particle diameter Di of said silicon microparticles in a particle interior domain of less than 50% of a radial direction is 0.5 to 1.5; and said silicon microparticles are solid silicon microparticles that contain silicon of more than 80 atomic % in a ratio of elements except oxygen.

(3) The porous silicon particle according to (1), wherein an area of a joint part between said silicon microparticles is 30% or less of a surface area of said silicon microparticles.

(4) A complex porous silicon particle comprises two or more silicon microparticles and two or more silicon compound particles that are joined together, wherein said silicon compound particles contain compound of silicon and one or more composite elements chosen from a group which consists of As, Ba, Ca, Ce, Co, Cr, Cu, Er, Fe, Gd, Hf, Lu, Mg, Mn, Mo, Nb, Nd, Ni, Os, Pr, Pt, Pu, Re, Rh, Ru, Sc, Sm, Sr, Ta, Te, Th, Ti, Tm, U, V, W, Y, Yb, and Zr; an average particle diameter of said complex porous silicon particle is 0.1 micrometers to 1000 micrometers; and a complex porous silicon particle has a three-dimensional network structure which consists of a continuous void.

(5) The complex porous silicon particle according to (4), wherein an average particle diameter or an average pillar diameter of said silicon microparticles is 2 nm to 2 micrometers; and said silicon microparticles are solid silicon microparticles containing silicon of more than 80 atomic % in a ratio of elements except oxygen.

(6) The complex porous silicon particle according to (4), wherein an average particle diameter of said silicon compound particles is 50 nm to 50 micrometers; and said silicon compound particles are particles of a solid silicon compound characterized by containing silicon of 50 to 90 atomic % in a ratio of elements except oxygen.

(7) The complex porous silicon particle according to (4), wherein Ds/Di which is a ratio of an average particle diameter Ds of said silicon microparticles in a surface neighborhood domain of more than 50% of a radial direction of said complex porous silicon particle to an average particle diameter Di of said silicon microparticles in a particle interior domain of less than 50% of a radial direction of said complex porous silicon particle is 0.5 to 1.5.

(8) The complex porous silicon particle according to (4) wherein, Xs/Xi which is a ratio of a porosity Xs of a surface neighborhood domain of more than 50% of a radial direction of said complex porous silicon particle to a porosity Xi of a particle interior domain of less than 50% of a radial direction of said complex porous silicon particle is 0.5 to 1.5.

(9) A manufacturing method of a porous silicon particle, which comprises: a process (a) of producing a silicon intermediate alloy which is an alloy of silicon and one or more intermediate alloy elements described in following Table 1, and a ratio of silicon is more than 10 atomic % to the whole, and is below the highest value in Si maximum content in the following Table 1 corresponding to said containing intermediate alloy element; a process (b) of dividing into silicon microparticles and a 2nd phase by immersing in a molten metal of one or more molten metal elements corresponding to said intermediate alloy element described in the following Table 1; and a process (c) of removing said 2nd phase; wherein said 2nd phase comprises an alloy of said intermediate alloy element and said molten metal element and/or said molten metal element replacing said intermediate alloy element.

(10) The manufacturing method of a porous silicon particle according to (9), wherein, in said process (a), said silicon intermediate alloy has a shape of a ribbon, a piece of foil, or a line of 0.1 micrometers to 2 mm-thick, or a granule or a lump of 10 micrometers to 50 mm of particle diameter.

(11) The manufacturing method of a porous silicon particle according to (9), wherein said process (c) comprises a process of dissolving and removing said 2nd phase by at least one of acid, alkali, and an organic solvent, or a process of evaporating and removing only said 2nd phase by heating and decompression.

(12) The manufacturing method of a porous silicon particle according to (9), wherein said process (a) is a process of manufacturing a molten metal of said silicon and said intermediate alloy element into a ribbon shaped silicon intermediate alloy by a single roll casting machine.

(13) The manufacturing method of a porous silicon particle according to (9), wherein said process (a) is a process of manufacturing a molten metal of said silicon and said intermediate alloy element into a powdered silicon intermediate alloy using a gas atomizing method or a rotation disk atomizing method.

(14) The manufacturing method of a porous silicon particle according to (9), wherein said process (a) contains a process of manufacturing a molten metal of said silicon and said intermediate alloy element into a lump silicon intermediate alloy by cooling within a mold.

(15) A manufacturing method of a porous silicon particle, which comprises: a process (a) of blending silicon to Cu so that a ratio of silicon is set to 10 to 30 atomic % to the whole, and manufacturing silicon intermediate alloy whose shape is a ribbon, a piece of foil or a line with 0.1 micrometers to 2 mm-thick, or a granule or a lump of 10 micrometers to 50 mm of particle diameter; a process (b) of dividing into silicon microparticles and a 2nd phase by immersing said silicon alloy in a molten metal whose main ingredients are one or more molten metal elements chosen from a group which consists of Al, Be, Cd, Ga, In, Sb, Sn, and Zn; and a process (c) of removing said 2nd phase; wherein in said process (b), said 2nd phase comprises an alloy of said Cu and said molten metal element and/or said molten metal element replacing Cu.

(16) A manufacturing method of a porous silicon particle, which comprises: a process (a) of blending silicon to Mg so that a ratio of silicon is set to 10 to 50 atomic % to the whole, and manufacturing silicon intermediate alloy whose shape is a ribbon, a piece of foil or a line with 0.1 micrometers to 2 mm-thick, or a granule or a lump of 10 micrometers to 50 mm of particle diameter; a process (b) of dividing into silicon microparticles and a 2nd phase by immersing said silicon alloy in a molten metal whose main ingredients are one or more molten metal elements chosen from a group which consists of Ag, Al, Au, Be, Bi, Ga, In, Pb, Sb, Sn, Tl, and Zn; and a process (c) of removing said 2nd phase; wherein in said process (b), said 2nd phase comprises an alloy of said Mg and said molten metal element and/or said molten metal element replacing Mg.

(17) A manufacturing method of a porous silicon particle, which comprises: a process (a) of blending silicon to Ni so that a ratio of silicon is set to 10 to 55 atomic % to the whole, and manufacturing silicon intermediate alloy whose shape is a ribbon, a piece of foil or a line with 0.1 micrometers to 2 mm-thick, or a granule or a lump of 10 micrometers to 50 mm of particle diameter; a process (b) of dividing into silicon microparticles and a 2nd phase by immersing said silicon alloy in a molten metal whose main ingredients are one or more molten metal elements chosen from a group which consists of Al, Be, Cd, Ga, In, Sb, Sn, and Zn; and a process (c) of removing said 2nd phase; wherein in said process (b), said 2nd phase comprises an alloy of said Ni and said molten metal element and/or said molten metal element replacing Ni.

(18) A manufacturing method of a porous silicon particle, which comprises: a process (a) of blending silicon to Ti so that a ratio of silicon is set to 10 to 82 atomic % to the whole, and manufacturing silicon intermediate alloy whose shape is a ribbon, a piece of foil or a line with 0.1 micrometers to 2 mm-thick, or a granule or a lump of 10 micrometers to 50 mm of particle diameter; a process (b) of dividing into silicon microparticles and a 2nd phase by immersing said silicon alloy in a molten metal whose main ingredients are one or more molten metal elements chosen from a group which consists of Ag, Al, Au, Be, Bi, Cd, Ga, In, Pb, Sb, Sn, and Zn; and a process (c) of removing said 2nd phase; wherein in said process (b), said 2nd phase comprises an alloy of said Ti and said molten metal element and/or said molten metal element replacing Ti.

(19) A manufacturing method of a complex porous silicon particle, which comprises: a process (a) of producing a silicon intermediate alloy which is an alloy of silicon, one or more intermediate alloy elements described in following Table 2 and one or more composite elements described in following Table 2, and a ratio of said composite element is 1 to 33 atomic % to said silicon, and a ratio of silicon is more than 10 atomic % of the sum of said silicon, said intermediate alloy element and said composite element, and is below the highest value in Si maximum content in the following Table 2 corresponding to said containing intermediate alloy element; a process (b) of dividing into silicon microparticles, silicon composite particles of silicon and composite element, and a 2nd phase by immersing in a molten metal of one or more molten metal elements corresponding to said intermediate alloy element described in the following Table 2; and a process (c) of removing said 2nd phase; wherein said 2nd phase comprises an alloy of said intermediate alloy element and said molten metal element and/or said molten metal element.

(20) The manufacturing method of the complex porous silicon particle according to (19), wherein, in said process (a), silicon (X atomic %), an intermediate alloy element (Y atomic %), and one or more composite elements ($Z_1$, $Z_2$, $Z_3$, ... atomic %) produces a silicon intermediate alloy which has the composition which satisfies the following formulas.

$$10 \leq X < [\text{Si maximum content}] \quad \text{formula (1)}$$

$$10 \leq a/(a+Y) \times 100 \leq [\text{Si maximum content}] \quad \text{formula (2)}$$

Note: $a = X - 1.5 \times (Z_1 + Z_2 + Z_3, \ldots)$
and [Si maximum content] is Si maximum content in Table 2 corresponding to said containing intermediate alloy element.

(21) A manufacturing method of a complex porous silicon composite particle, which comprises: a process (a) of producing a silicon intermediate alloy which is an alloy of silicon and one or more intermediate alloy elements described in Table 2, and a ratio of silicon is more than 10 atomic % to the whole, and is below the highest value in Si maximum content in Table 2 corresponding to said containing intermediate alloy element; a process (b) of dividing into silicon microparticles, silicon composite particles of silicon and the composite element, and a 2nd phase by immersing in an alloy bath of one or more molten metal elements described in Table 2, said alloy bath contains one or more composite elements corresponding to said intermediate alloy element described in Table 2, each composite element is below 10 atomic % and sum of them is below 20 atomic %; and a process (c) of removing said 2nd phase; wherein said 2nd phase comprises an alloy of said intermediate alloy element and said molten metal element and/or said molten metal element.

(22) The manufacturing method of a complex porous silicon particle according to (19), wherein in said process (a), said silicon intermediate alloy is a shape of a ribbon, a piece of foil, or a line of 0.1 micrometers to 2 mm-thick, or a powder, a granule or a lump of 10 micrometers to 50 mm of particle diameter.

(23) The manufacturing method of a complex porous silicon particle according to (19), wherein said process (c) comprises a process of dissolving and removing said 2nd phase by at least one of acid, alkali, and an organic solvent, or a process of evaporating and removing only said 2nd phase by heating and decompression.

(24) The manufacturing method of a complex porous silicon particle according to (19), wherein said process (a) is a process of manufacturing a molten metal of said silicon, said intermediate alloy element and said composite element into a silicon intermediate alloy of a ribbon shape or thin-plate shape by a single roll casting machine or double roll casting machine.

(25) The manufacturing method of a complex porous silicon particle according to (19), wherein said process (a) is a process of manufacturing a molten metal of said silicon, said intermediate alloy element and said composite element into a powdered silicon intermediate alloy using an atomizing method.

(26) The manufacturing method of a complex porous silicon particle according to (19), wherein said process (a) contains a process of manufacturing a molten metal of said silicon, said intermediate alloy element and said composite element into a lump silicon intermediate alloy by cooling within a mold.

(27) A manufacturing method of a porous silicon particle, which comprises: a process (a) of blending silicon (X atomic %), Cu (Y atomic %) and one or more composite elements chosen from a group which consists of As, Ba, Ca, Ce, Co, Cr, Er, Fe, Gd, Hf, Mn, Mo, Nb, Nd, Ni, Os, Pr, Pt, Pu, Re, Rh, Ru, Sc, Sm, Sr, Ta, Te, Th, Ti, Tm, U, V, W, Y, Yb and Zr ($Z_1$, $Z_2$, $Z_3$, ... atomic %) to satisfy formulas (1) and (2) in (20), so that a ratio of silicon is set to 10 to 30 atomic % to the whole, and manufacturing silicon intermediate alloy whose shape is a ribbon, a piece of foil or a line with 0.1 micrometers to 2 mm-thick, or a powder, a granule or a lump of 10 micrometers to 50 mm of particle diameter; a process (b) of dividing into silicon microparticles, silicon compound particle of silicon and said composite element, and a 2nd phase by immersing said silicon alloy in a molten metal whose main ingredient is one or more molten metal elements chosen from a group which consists of Al, Be, Cd, Ga, In, Sb, Sn, and Zn; and, a process (c) of removing said 2nd phase; wherein said 2nd phase comprises an alloy of said Cu and said molten metal element and/or said molten metal element, and said process (c) comprises a process of dissolving and removing said 2nd phase by at least one of acid, alkali, and an organic solvent, or a process of evaporating and removing only said 2nd phase by heating and decompression.

(28) A manufacturing method of a porous silicon particle, which comprises: a process (a) of blending silicon (X atomic %) to Cu (Y atomic %) so that a ratio of silicon is set to 10 to 30 atomic % to the whole, and manufacturing silicon intermediate alloy whose shape is a ribbon, a piece of foil or a line with 0.1 micrometers to 2 mm-thick, or a granule or a lump of 10 micrometers to 50 mm of particle diameter; a process (b) of dividing into silicon microparticles, silicon compound particle of silicon and said composite element and a 2nd phase by immersing said silicon intermediate alloy in a molten alloy whose main ingredients are one or more molten metal elements chosen from a group which consists of Al, Be, Cd, Ga, In, Sb, Sn, and Zn, and which contains one or more composite elements chosen from a group which consists of As, Ba, Ca, Ce, Co, Cr, Er, Fe, Gd, Hf, Mn, Mo, Nb, Nd, Ni, Os, Pr, Pt, Pu, Re, Rh, Ru, Sc, Sm, Sr, Ta, Te, Th, Ti, Tm, U, V, W, Y, Yb and Zr, each composite element is below 10 atomic % and sum of them is below 20 atomic %; and, a process (c) of removing said 2nd phase; wherein said 2nd phase comprises an alloy of said Cu and said molten metal element and/or said molten metal element, and said process (c) comprises a process of dissolving and removing said 2nd phase by at least one of acid, alkali, and an organic solvent, or a process of evaporating and removing only said 2nd phase by heating and decompression.

(29) A manufacturing method of a porous silicon particle, which comprises: a process (a) of blending silicon (X atomic %), Mg (Y atomic %) and one or more composite elements chosen from a group which consists of As, Ba, Ca, Ce, Cr, Co, Er, Fe, Gd, Hf, Mn, Mo, Nb, Nd, Ni, Os, Pr, Pt, Pu, Re, Rh, Ru, Sc, Sm, Sr, Ta, Te, Th, Ti, Tm, U, V, W, Y, Yb and Zr ($Z_1, Z_2, Z_3, \ldots$ atomic %) to satisfy formulas (1) and (2) in (20), so that a ratio of silicon is set to 10 to 50 atomic % to the whole, and manufacturing silicon intermediate alloy whose shape is a ribbon, a piece of foil or a line with 0.1 micrometers to 2 mm-thick, or a powder, a granule or a lump of 10 micrometers to 50 mm of particle diameter; a process (b) of dividing into silicon microparticles, silicon compound particle of silicon and said composite element, and a 2nd phase by immersing said silicon intermediate alloy in a molten metal whose main ingredients are one or more molten metal elements chosen from a group which consists of Ag, Al, Au, Be, Bi, Ga, In, Pb, Sb, n, Tl and Zn; and, a process (c) of removing said 2nd phase; wherein said 2nd phase comprises an alloy of said Mg and said molten metal element and/or said molten metal element, and said process (c) comprises a process of dissolving and removing said 2nd phase by at least one of acid, alkali, and an organic solvent, or a process of evaporating and removing only said 2nd phase by heating and decompression.

(30) A manufacturing method of a porous silicon particle, which comprises: a process (a) of blending silicon (X atomic %) to Mg (Y atomic %) so that a ratio of silicon is set to 10 to 50 atomic % to the whole, and manufacturing silicon intermediate alloy whose shape is a ribbon, a piece of foil or a line with 0.1 micrometers to 2 mm-thick, or a granule or a lump of 10 micrometers to 50 mm of particle diameter; a process (b) of dividing into silicon microparticles, silicon compound particle of silicon and said composite element and a 2nd phase by immersing said silicon intermediate alloy in a molten alloy whose main ingredients are one or more molten metal elements chosen from a group which consists of Ag, Al, Au, Be, Bi, Ga, In, Pb, Sb, Sn, Tl and Zn, and which contains one or more composite elements chosen from a group which consists of As, Ba, Ca, Ce, Cr, Co, Er, Fe, Gd, Hf, Mn, Mo, Nb, Nd, Ni, Os, Pr, Pt, Pu, Re, Rh, Ru, Sc, Sm, Sr, Ta, Te, Th, Ti, Tm, U, V, W, Y, Yb and Zr, each composite elements is below 10 atomic % and sum of them is below 20 atomic %; and a process (c) of removing said 2nd phase; wherein said 2nd phase comprises an alloy of said Mg and said molten metal element and/or said molten metal element, and said process (c) comprises a process of dissolving and removing said 2nd phase by at least one of acid, alkali, and an organic solvent, or a process of evaporating and removing only said 2nd phase by heating and decompression.

(31) A manufacturing method of a porous silicon particle, which comprises: a process (a) of blending silicon (X atomic %), Ni (Y atomic %) and one or more composite elements chosen from a group which consists of As, Ba, Ca, Ce, Cr, Co, Er, Fe, Gd, Hf, Mn, Mo, Nb, Nd, Os, Pr, Pt, Pu, Re, Rh, Ru, Sc, Sm, Sr, Ta, Te, Th, Ti, Tm, U, V, W, Y, Yb and Zr ($Z_1, Z_2, Z_3, \ldots$ atomic %) to satisfy formulas (1) and (2) in (20), so that a ratio of silicon is set to 10 to 55 atomic % to the whole, and manufacturing silicon intermediate alloy whose shape is a ribbon, a piece of foil or a line with 0.1 micrometers to 2 mm-thick, or a powder, a granule or a lump of 10 micrometers to 50 mm of particle diameter; a process (b) of dividing into silicon microparticles, silicon compound particle of silicon and said composite element, and a 2nd phase by immersing said silicon intermediate alloy in a molten metal whose main ingredients are one or more molten metal elements chosen from a group which consists of Al, Be, Cd, Ga, In, Sb, Sn, and Zn; and, a process (c) of removing said 2nd phase; wherein said 2nd phase comprises an alloy of said Ni and said molten metal element and/or said molten metal element, and said process (c) comprises a process of dissolving and removing said 2nd phase by at least one of acid, alkali, and an organic solvent, or a process of evaporating and removing only said 2nd phase by heating and decompression.

(32) A manufacturing method of a porous silicon particle, which comprises: a process (a) of blending silicon (X atomic %) to Ni (Y atomic %) so that a ratio of silicon is set to 10 to 55 atomic % to the whole, and manufacturing silicon intermediate alloy whose shape is a ribbon, a piece of foil or a line with 0.1 micrometers to 2 mm-thick, or a granule or a lump of 10 micrometers to 50 mm of particle diameter; a process (b) of dividing into silicon microparticles, silicon compound particle of silicon and said composite element and a 2nd phase by immersing said silicon intermediate alloy in a molten alloy whose main ingredients are one or more molten metal elements chosen from a group which consists of Al, Be, Cd, Ga, In, Sb, Sn, and Zn, and which contains one or more composite elements chosen from a group which consists of As, Ba, Ca, Ce, Cr, Co, Er, Fe, Gd, Hf, Mn, Mo, Nb, Nd, Os, Pr, Pt, Pu, Re, Rh, Ru, Sc, Sm, Sr, Ta, Te, Th, Ti, Tm, U, V, W, Y, Yb and Zr, each composite element is below 10 atomic % and sum of them is below 20 atomic %; and, a process (c) of removing said 2nd phase; wherein said 2nd phase comprises an alloy of said Ni and said molten metal element and/or said molten metal element, and said process (c) comprises a process of dissolving and removing said 2nd phase by at least one of acid, alkali, and an organic solvent, or a process of evaporating and removing only said 2nd phase by heating and decompression.

(33) A manufacturing method of a porous silicon particle, which comprises: a process (a) of blending silicon (X atomic %), Ti (Y atomic %) and one or more composite elements chosen from a group which consists of As, Ba, Ca, Ce, Cr, Co, Er, Fe, Gd, Hf, Lu, Mg, Mn, Mo, Nb, Nd, Ni, Os, Pr, Pt, Pu, Re, Rh, Ru, Sc, Sm, Sr, Ta, Te, Th, Tm, U, V, W, Y, Yb and Zr ($Z_1, Z_2, Z_3, \ldots$ atomic %) to satisfy formulas (1) and (2) in (20), so that a ratio of silicon is set to 10 to 80 atomic % to the whole, and manufacturing silicon intermediate alloy whose shape is a ribbon, a piece of foil or a line with 0.1 micrometers to 2 mm-thick, or a powder, a granule or a lump of 10 micrometers to 50 mm of particle diameter; a process (b) of dividing into silicon microparticles, silicon compound particle of silicon and said composite element, and a 2nd phase by immersing said silicon intermediate alloy in a molten metal whose main ingredients are one or more molten metal elements chosen from a group which consists of Ag, Al, Au, Be, Bi, Cd, Ga, In, Pb, Sb, Sn and Zn; and, a process (c) of removing said 2nd phase; wherein said 2nd phase comprises an alloy of said Ti and said molten metal element and/or said molten metal element, and said process (c) comprises a process of dissolving and removing said 2nd phase by at least one of acid, alkali, and an organic solvent, or a process of evaporating and removing only said 2nd phase by heating and decompression.

(34) A manufacturing method of a porous silicon particle, which comprises: a process (a) of blending silicon (X atomic %) to Ti (Y atomic %) so that a ratio of silicon is set to 10 to 80 atomic % to the whole, and manufacturing silicon intermediate alloy whose shape is a ribbon, a piece of foil or a line with 0.1 micrometers to 2 mm-thick, or a granule or a lump of 10 micrometers to 50 mm of particle diameter; a process (b) of dividing into silicon microparticles, silicon compound particle of silicon and said composite element and a 2nd phase by immersing said silicon intermediate alloy in a molten alloy whose main ingredients are one or more molten metal elements chosen from a group which consists of Ag, Al, Au, Be, Bi, Cd, Ga, In, Pb, Sb, Sn, and Zn and which contains one or more composite elements chosen from a group which consists of As, Ba, Ca, Ce, Cr, Co, Er, Fe, Gd, Hf, Lu, Mg, Mn, Mo, Nb, Nd, Ni, Os, Pr, Pt, Pu, Re, Rh, Ru, Sc, Sm, Sr, Ta, Te, Th, Tm, U, V, W, Y, Yb, and Zr, each composite elements is below 10 atomic % and sum of them is below 20 atomic %; and, a process (c) of removing said 2nd phase; wherein said 2nd phase comprises an alloy of said Ti and said molten metal element and/or said molten metal element, and said process (c) comprises a process of dissolving and removing said 2nd phase by at least one of acid, alkali, and an organic solvent, or a process of evaporating and removing only said 2nd phase by heating and decompression.

Effect of the Invention

According to the present invention, porous silicon particles and complex porous silicon particles suitable for negative electrode materials etc. for lithium-ion batteries, which achieve high capacity and good cycling characteristics, can be obtained.

BEST MODE FOR CARRYING OUT THE INVENTION (Porous Silicon Particle)
(Composition of a Porous Silicon Particle)

Porous silicon particle 1 of the present invention is explained with reference to FIG. 1. Porous silicon particle 1 is a porous body which has a three-dimensional network structure of having the continuous void, and silicon microparticles 3 that are joined together. Its average particle diameter is 0.1 micrometers to 1000 micrometers. Its average porosity is 15 to 93%. Porous silicon particle 1 is characterized by being a solid particle which contains silicon of more than 80 atomic % in a ratio of elements except oxygen, and whose remainder is the intermediate alloy element described later, a molten metal element, and other inescapable impurities.

Even if an oxide layer of 20 nm or less is formed on the surface of these silicon microparticles, it is satisfactory on the characteristic. After removing the 2nd phase with hydrochloric acid etc., the oxide layer (oxide film) of the surface of silicon microparticles can be formed by immersed in nitric acid of 0.0001 to 0.1N. Otherwise after removing the 2nd phase by distillation under reduced pressure, the oxide layer can be also formed by holding under the oxygen partial pressure of 0.00000001 to 0.02 MPa.

Figure 1:
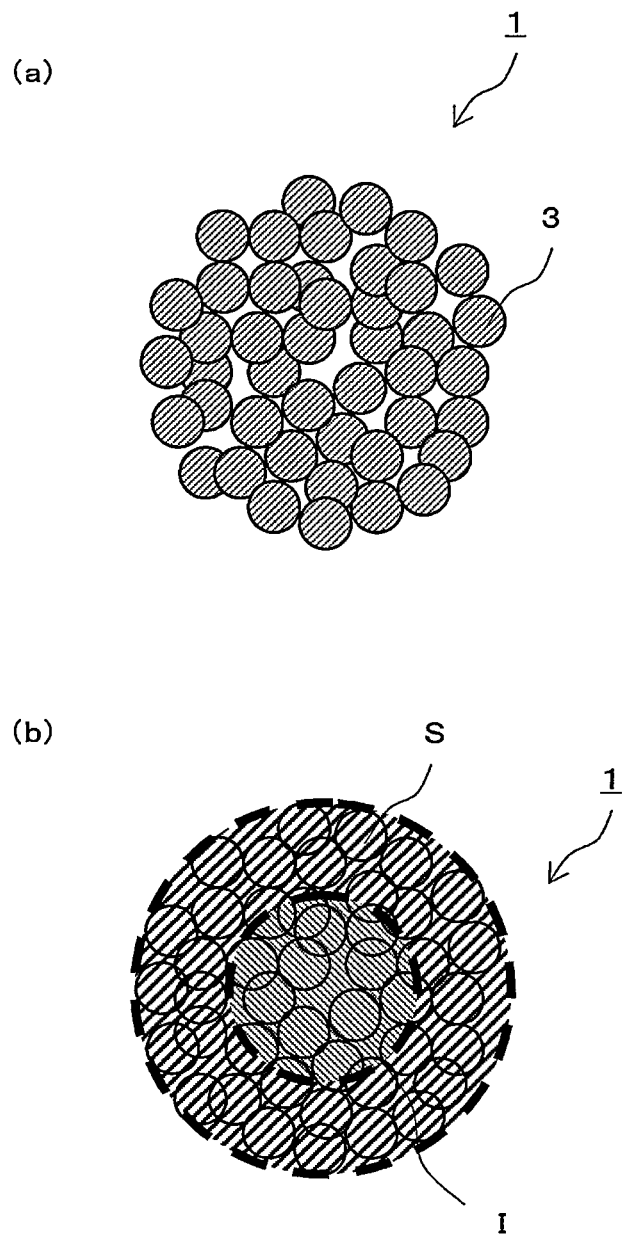
FIG. 1: (a) a figure showing porous silicon particle 1 of the present invention, (b) a figure showing a surface neighborhood domain S and a particle interior domain I of porous silicon particle 1.

As shown in FIG. 1 (b), porous silicon particle 1 is divided into a surface neighborhood domain S of more than 50% of a radial direction and a particle interior domain I of less than 50% of a radial direction. When Ds is the average particle diameter of silicon microparticles in the surface neighborhood domain of the porous silicon particle and Di is the average particle diameter of silicon microparticles in the particle interior domain of the porous silicon particle, Ds/Di is 0.5 to 1.5.

In the porous silicon particle, Xs/Xi which is a ratio of a porosity Xs of the surface neighborhood domain S to a porosity Xi of the particle interior domain I is 0.5 to 1.5.

That is, the porous silicon particle of the present invention has similar pore structure through the surface neighborhood domain and the particle interior domain, and has an almost uniform pore structure over the whole particle.

Silicon microparticle 3 which forms porous silicon particle 1 is characterized by having an average particle diameter or an average pillar diameter of 2 nm to 2 micrometers, being a single crystal which has crystallinity, and being the solid particles contains silicon more than 80 atomic % in a ratio of elements except oxygen. In addition, if almost spherical particulates exist independently, particle diameter can be measured. However, when two or more particular join and form approximately pillar-shape, the average pillar diameter corresponding to the diameter of the pillar in a cross-section perpendicular to a long axis is used for evaluation.

The three-dimensional network structure in the present invention means a structure like a co-continuous structure caused in a spinodal decomposition process, or a sponge structure where the hole has connected mutually. The pore size of the hole of a porous silicon particle is about 0.1 to 300 nm.

The average particle diameter or the average pillar diameter of silicon microparticle 3 is 2 nm to 2 micrometers, preferably 10 to 500 nm and more preferably 15 to 100 nm. The average porosity of porous silicon particle 1 is 15 to 93%, 30 to 80% preferably, and 40 to 70% more preferably.

Silicon microparticles 3 are joined locally and the area of the joined part of silicon microparticle 3 is 30% or less of the surface area of said silicon microparticle. Accordingly, compared with the surface area determined while assuming that silicon microparticle 3 existed independently, the surface area of porous silicon particle 1 is more than 70%.

The porous silicon particle concerning the present invention is usually aggregated, and exists. Measurement of particle diameter uses picture information of an electron microscope (SEM), and a diameter of a volume standard median of a dynamic-light-scattering photometer (DLS) together. An average particle diameter can be measured by checking particle shape beforehand by an SEM image and determining particle diameters using image-analysis software (for example, "A-zo-kun" (registered trademark) by Asahi Kasei Engineering), and distributing particles in a solvent and measuring by DLS (for example, DLS-8000 by Otsuka Electronics). If particles are fully distributing and are not aggregating at the time of DLS measurement, the almost same measurement result is obtained by SEM and DLS.

Since the silicon microparticles forming a porous silicon particle have joined mutually, the average particle diameter is mainly determined using a surface scanning electron microscope or a transmission electron microscope.

For an average pillar diameter, pillar diameter is defined as the diameter of the pillar of the cylindrical (pillar-shaped) silicon particles having an aspect ratio over 5. The average value of this pillar diameter is an average pillar diameter. This pillar diameter mainly determined by performing an SEM observation of particles.

The average porosity is the ratio of a void in particles. Although the fine pores below a submicron can be measured by a nitrogen gas adsorption method, pore size distributing broadly can be measured by an electron microscope observation, a mercury press-in method (JIS R 1655 "Test methods for pore size distribution of fine ceramic green body by mercury porosimetry", derived from the relations pressure and volume of mercury when mercury intrudes in a pore) or a gas adsorption method (JIS Z 8830:2001 "Determination of the specific surface area of powders (solids) by gas adsorption method") etc.

Porous silicon particle 1 of the present invention has an average particle diameter of 0.1 micrometers to 1000 micrometers depending on Si concentration of Si intermediate alloy, or the cooling rate at the time of the intermediate alloy manufacturing. Particle diameter becomes small by making Si concentration low, otherwise carrying out a cooling rate early. When using it as an active material for negative electrodes, it is preferred that the average particle diameter is 0.1 to 50 micrometers, and it is preferred that it is 1 to 30 micrometers and also 5 to 20 micrometers more preferably. Therefore, when a porous silicon particle is too small, it is used as an aggregated object or a granulated body. When a porous silicon particle is too large, it is satisfactory even if this porous silicon particle is roughly ground and used.

(Outline of the Manufacturing Method of a Porous Silicon Particle)

Figure 2:
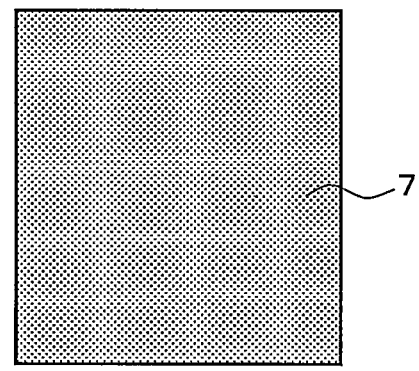
FIG. 2: (a) to (c) a figure showing the outline of the manufacturing method of porous silicon particle 1.
Figure 2:
Figure 2:
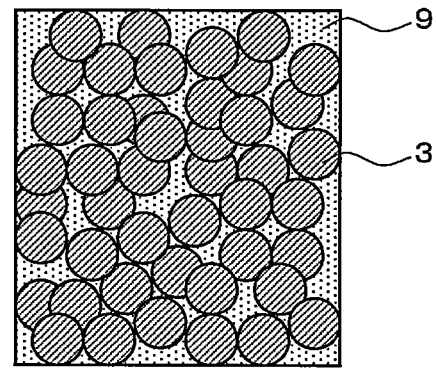
Figure 2:
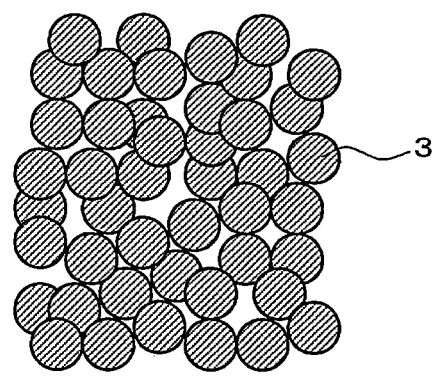

The outline of the manufacturing method of porous silicon particle 1 is explained using FIG. 2.

First, as shown in FIG. 2 (a), silicon and an intermediate alloy element are heated and melted and silicon intermediate alloy 7 is produced.

Then, silicon intermediate alloy 7 is immersed in the molten metal of the molten metal element in Table 1. At this time, as shown in FIG. 2 (b), the intermediate alloy element of silicon intermediate alloy 7 elutes in a molten metal and forms the 2nd phase 9 that mainly consists of a molten metal element, and only silicon is deposited or crystallizes as silicon microparticle 3. The 2nd phase 9 comprises an alloy of an intermediate alloy element and a molten metal element, or a molten metal element replacing the intermediate alloy element. These silicon microparticles 3 join mutually and form the three-dimensional network structure.

Then, as shown in FIG. 2 (c), after the 2nd phase is removed by methods, such as a dealloying using acid, alkali, etc., porous silicon particle 1 which consists of joined silicon microparticle 3 is obtained.

The phenomenon in each process is explained below. If silicon and an intermediate alloy element (X) are melted and solidified, silicon intermediate alloy 7 which is an alloy of silicon and an intermediate alloy element will be formed.

Then, if this silicon intermediate alloy is immersed in a bath of a molten metal element (Y) specified in Table 1, the molten metal element (Y) is spreads and permeates in the silicon intermediate alloy, and the intermediate alloy element (X) in the silicon intermediate alloy will form an alloy layer with the molten metal element (Y) as the 2nd phase. Otherwise, the intermediate alloy element (X) in the alloy is eluted in the metal bath of the molten metal element (Y), and the molten metal element (Y) forms the new 2nd phase. In this reaction, the silicon atom contained in the silicon intermediate alloy is left. As a result, when this silicon atom aggregates in nano size from the diffused situation, the network of a silicon atom is made and three-dimensional network structure is formed.

The silicon primary crystal which is not an alloy in the intermediate alloy remains as the primary crystal of silicon, regardless of a deposit of a silicon microparticle at an immersion process, and regardless of removal of the 2nd phase, such as a dealloying. Therefore, silicon which became a crystal once is coarse and does not form the three-dimensional network structure. Therefore, in the process of forming a silicon intermediate alloy, it is preferred that the crystal of silicon does not arise in a silicon alloy.

From the above processes, the following conditions are required for intermediate alloy element (X) and a molten metal element (Y).

Condition 1: the melting point of the molten metal element (Y) is lower than the melting point of silicon over 50K.

Silicon dissolves into a molten metal when a silicon alloy is immersed in the molten metal of the molten metal element, if the melting point of the molten metal element (Y) and the melting point of silicon are near. Therefore condition 1 is required.

Condition 2: when silicon and the intermediate alloy element are solidified, Si primary crystal should not come out.

When forming silicon and the alloy of intermediate alloy element (X) and silicon concentration increases, in a hyper-eutectic region, a coarse silicon primary crystal will be formed. In this silicon crystal, Diffusion and re-aggregation of silicon atoms in an immersion process do not occur, and formation of the three-dimensional network structure does not occur.

Condition 3: the solubility of silicon to the molten metal element is lower than 5 atom %.

The reason is to prevent the 2nd phase from containing silicon, when intermediate alloy element (X) and a molten metal element (Y) form the 2nd phase.

Condition 4: the intermediate alloy element and the molten metal element should not separate into two phases.

When intermediate alloy element (X) and a molten metal element (Y) separate into two phases, an intermediate alloy element is not separated from a silicon alloy, and diffusion and re-aggregation of a silicon atom do not occur. Even if it performs processing by acid, an intermediate alloy element will remain into silicon particles.

When the above conditions 1 to 4 are taken into consideration, in order to manufacture a porous silicon particle, the usable combination of the intermediate alloy element and a molten metal element is as follows. The ratio of silicon is more than 10 atom % of the whole, and it is below the highest value in the Si maximum content in the following Table 1 corresponding to the intermediate alloy element.

TABLE 1

| Intermediate alloy element | Si maximum content [atomic %] | Molten metal elements |
| --- | --- | --- |
| As | 50 | Ag, Al, Cd, Ga, In, Sn, Zn, |
| Ba | 77 | Ag, Al, Be, Bi, Cd, Ga, In, Pb, Sn, Tl, Zn, |
| Ca | 69 | Ag, Al, Au, Be, Bi, Cd, Ga, In, Pb, Sb, Sn, Tl, Zn, |
| Ce | 87 | Ag, Al, Au, Bi, Cd, Ga, In, Pb, Sb, Sn, Zn, |
| Co | 77 | Al, Be, Ga, In, Sb, Sn, Zn, |
| Cr | 82 | Al, Be, Ga, Sb, Zn, |
| Cu | 30 | Al, Be, Cd, Ga, In, Sb, Sn, Zn, |
| Er | 65 | Ag, Al, Au, Bi, Ga, In, Sn, Tl, Zn, |
| Fe | 67 | Al, Be, Ga, Sb, Sn, Zn, |
| Gd | 64 | Ag, Au, Bi, Ga, In, Pb, Sn, Sb, Tl, Zn, |
| Hf | 91 | Al, Au, Be, Ga, Sn, |
| Lu | 63 | Ag, Al, Au, Bi, Ga, Pb, Sn, Tl, Zn, |
| Mg | 50 | Ag, Al, Au, Be, Bi, Ga, In, Pb, Sb, Sn, Tl, Zn, |
| Mn | 67 | Ag, Al, Au, Bi, Ga, In, Sb, Sn, Zn, |
| Mo | 98 | Al, Be, Ga, Sb, Sn, Zn, |
| Nb | 98 | Al, Au, Be, Ga, In, Sb, Sn, Zn, |
| Nd | 83 | Ag, Al, Au, Bi, Cd, Ga, In, Sb, Sn, Tl, Zn, |
| Ni | 55 | Al, Be, Cd, Ga, In, Sb, Sn, Zn, |
| P | 50 | Ag, Al, Au, Cd, Ga, In, Sn, Zn, |
| Pd | 52 | Al, Be, Bi, Cd, Ga, In, Pb, Sb, Sn, Tl, Zn, |
| Pr | 83 | Ag, Al, Au, Bi, Cd, Ga, In, Pb, Sb, Sn, Tl, Zn, |
| Pt | 67 | Ag, Al, Be, Bi, Cd, Ga, In, Pb, Sb, Sn, Tl, Zn, |
| Pu | 83 | Ag, Al, Au, Be, Bi, Cd, Ga, In, Pb, Sn, Zn, |
| Re | 90 | Be, |
| Rh | 67 | Al, Bi, Pb, Sb, Sn, Zn, |
| Ru | 83 | Al, Be, Sn, Zn, |
| Sc | 85 | Ag, Al, Ga, In, |
| Sm | 85 | Ag, Al, Au, Bi, Cd, Ga, In, Pb, Sb, Sn, Tl, Zn, |
| Sr | 80 | Ag, Al, Au, Be, Bi, Cd, Ga, In, Pb, Sb, Tl, Zn, |
| Ta | 99 | Al, Au, Be, Ga, In, |
| Te | 35 | Ag, Al, Au, Bi, Cd, Ga, In, Pb, Sb, Sn, Tl, Zn, |
| Th | 95 | Ag, Al, Au, Be, Bi, Cd, In, Pb, Sn, Tl, Zn, |
| Ti | 82 | Ag, Al, Au, Be, Bi, Cd, Ga, In, Pb, Sb, Sn, Zn, |
| Tm | 85 | Ag, Al, Au, Bi, Ga, In, Zn, |
| U | 86 | Al, Au, Be, Bi, Cd, Ga, Pb, Sb, Sn, Zn, |
| V | 97 | Al, Au, Be, Ga, Sn, Zn, |
| W | 98 | Al, Be, |
| Y | 82 | Ag, Al, Be, Bi, Cd, Ga, In, Pb, Sb, Sn, Zn, |
| Yb | 82 | Ag, Al, Au, Be, Bi, Cd, Ga, In, Pb, Sb, Sn, Tl, Zn, |
| Zr | 90 | Ag, Al, Au, Be, Bi, Cd, Ga, In, Pb, Sb, Sn, Zn, |

When using Cu as the intermediate alloy element, the content of Si is 10 to 30 atom % to the sum of Si and the intermediate alloy element, and the average porosity of the obtained porous silicon particles is 47 to 85%.

When using Mg as the intermediate alloy element, the content of Si is 10 to 50 atom % to the sum of Si and the intermediate alloy element, and the average porosity of the obtained porous silicon particles is 42 to 92%.

When using Ni as the intermediate alloy element, the content of Si is 10 to 55 atom % to the sum of Si and the intermediate alloy element, and the average porosity of the obtained porous silicon particles is 15 to 85%.

When using Ti as the intermediate alloy element, the content of Si is 10 to 82 atom % to the sum of Si and the intermediate alloy element, and the average porosity of the obtained porous silicon particles is 15 to 89%.

When two or more mentioned elements can also be used as intermediate alloy elements, in that case, the molten metal element corresponding to both of these intermediate alloy elements is used as a molten metal element.

(Manufacturing Method of a Porous Silicon Particle)

The manufacturing method of the porous silicon particle of the present invention is explained.

First, mixture of silicon and one or more intermediate alloy elements chosen from the group which consists of Ba, Ca, Ce, Co, Cr, Cu, Er, Fe, Gd, Hf, Lu, Mg, Mn, Mo, Nb, Nd, Ni, P, Pd, Pr, Pt, Pu, Re, Rh, Ru, Sc, Sm, Sr, Ta, Te, Th, Ti, Tm, U, V, W, Y, Yb and Zr described in Table 1, so that the ratio of silicon to the whole is 10 to 98 atomic %, preferably 15 to 50 atomic %, is heated and melts in a vacuum furnace or a non-oxidizing atmosphere furnace etc.

Figure 3:
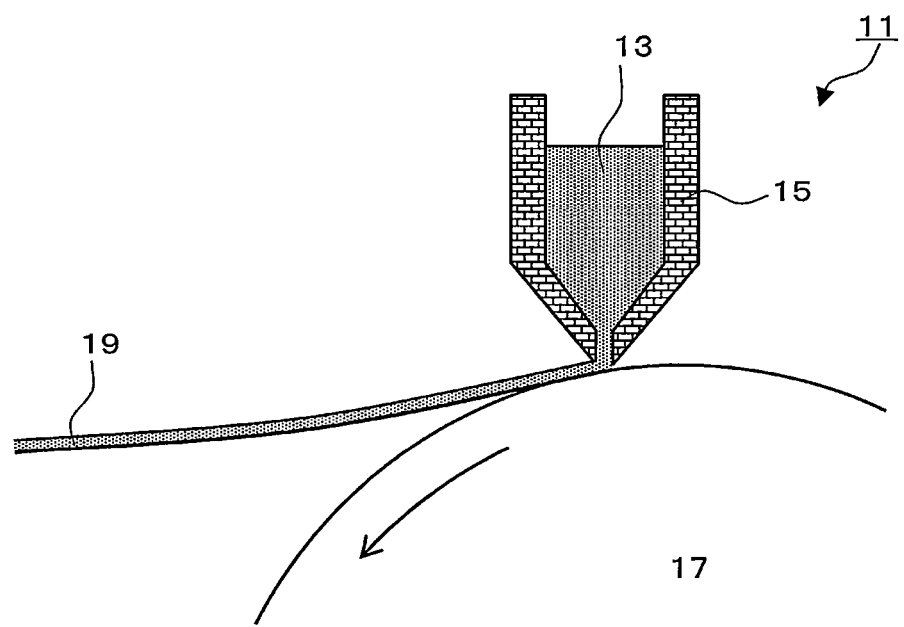
FIG. 3: a figure explaining the manufacturing process of a ribbon base silicon intermediate alloy of the present invention.

Then, for example, using thin plate continuous casting by a double roll casting machine, or single roll casting machine 11 as shown in FIG. 3, etc., melted silicon alloy 13 is dropped from crucible 15, and is solidified touching steel rolls 17 which rotate along the arrow direction in the figure, and a line or a ribbon shaped silicon intermediate alloy 19 is manufactured. A linear mother alloy may be manufactured by a direct spinning method. Or a silicon intermediate alloy may be manufactured as the shape of a piece of foil which has fixed length unlike a line or a ribbon shape.

The thickness of silicon intermediate alloy 19 of a line or a ribbon shape is preferably 0.1 micrometers to 2 mm, more preferably it is 0.1 to 500 micrometers, and further preferably it is 0.1 to 50 micrometers. Cooling rates at the time of the solidification of the silicon intermediate alloy is 0.1K/s or more, preferably it is 100 K/s or more, and more preferably it is 400K/s or more. This contributes to shortening the heat treatment time in the next process by making small the particle diameter of the primary crystal generated in an early stage of solidification. The particle diameter of a porous silicon particle also becomes small proportionally because the particle diameter of this primary crystal becomes small. If the thickness of a silicon alloy (intermediate alloy) becomes thick at more than 2 mm, since Si content is high, it is not desirable from a crack, disconnection, etc. coming out deficiently in toughness.

Figure 4:
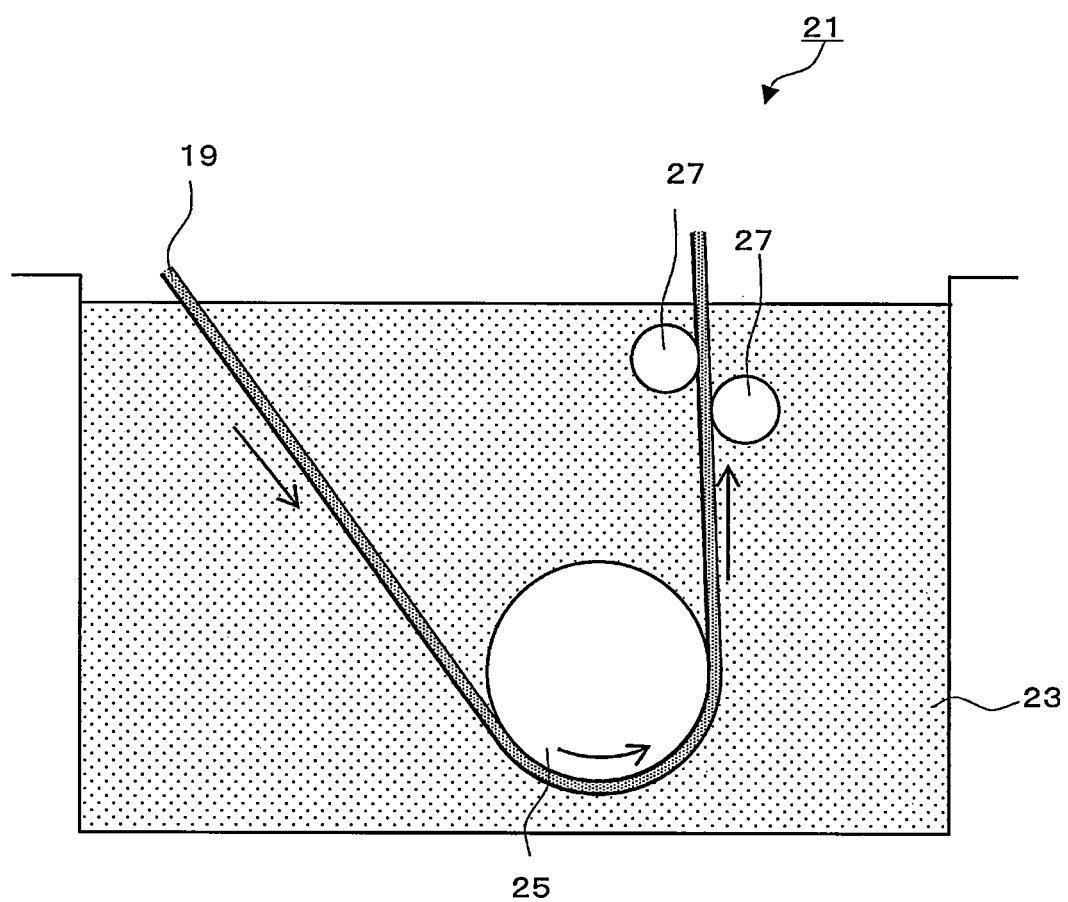
FIG. 4: a figure explaining the immersion process to the molten metal element of the ribbon base silicon intermediate alloy of the present invention.

Next, a silicon intermediate alloy is immersed in the molten metal of the molten metal element chosen from Ag, Al, Au, Be, Bi, Cd, Ga, In, Pb, Sb, Sn, Tl, and Zn in Table 1 corresponding to the used intermediate alloy element. The spinodal decomposition of silicon (deposit of a silicon microparticle) and the 2nd phase that is an alloy of an intermediate alloy element and a molten metal element, or the 2nd phase that comprises a said molten metal element replacing the intermediate alloy element are formed. Si microparticles are formed for the first time at this immersion process. In an immersion process, for example using molten metal immersion apparatus 21 as shown in FIG. 4, ribbon shape silicon intermediate alloy 19 is sent in the direction of an arrow of a figure, and is immersed in molten metal 23 of a molten metal element. Then, it is obtained as roll through sink roll 25 or support roll 27. Molten metal 23 is heated to 10K higher temperature than the liquidus temperature of a molten metal element. Although based also on molten metal temperature, the immersion time to molten metal 23 is 5 seconds or more and 10000 seconds or less preferably. If immersed over 10000 seconds, a coarse Si grain will generate. And this is cooled under non-oxidizing atmosphere. It is more desirable not to contain oxygen in molten metal 23 as below-mentioned.

Then the 2nd phase is removed by a process of dissolving and removing said 2nd phase by at least one of acid, alkali, and an organic solvent, or a process of evaporating and removing only said 2nd phase by heating and decompression. The 2nd phase is an alloy of the intermediate alloy element and the molten metal element or comprises said molten metal element replacing intermediate alloy element. A porous silicon particle is obtained by removal of the 2nd phase. As acid, what is necessary is just acid which dissolves an intermediate alloy element and a molten metal element, and does not dissolve silicon, and nitric acid, hydrochloric acid, sulfuric acid, etc. are mentioned.

After removing the 2nd phase by dissolving by acid, alkali, an organic solvent, etc., otherwise by heating and decompression distillation, the porous silicon particle which comprises microparticles is obtained. When it is dissolved by acid, alkali, an organic solvent, etc., washing and drying are performed. The particle diameter is 0.1 micrometers to 1000 micrometers by the silicon concentration of a silicon intermediate alloy, and the cooling rate at the time of silicon intermediate alloy production. Particle diameter becomes small by making silicon concentration low, otherwise cooling quickly. When using it as an active material for negative electrodes, the average particle diameter is 0.1 to 50 micrometers preferably, 1 to 30 micrometers more preferably and 5 to 20 micrometers further preferably. When a porous silicon particle is small, an aggregate or a granulated body is produced using a conductive binder, and slurry is applied on a current collector. When a porous silicon particle is large, coarsely ground porous silicon particles by a mortar etc. may be used. Since microparticles are joined locally, it can be crushed easily.

(Other Examples of the Manufacturing Method of a Porous Silicon Particle)

As other examples of the manufacturing method of complex porous silicon particle 1, a line or a ribbon shape silicon intermediate alloy 19 may be replaced with a powdered, a granular and a lump silicon intermediate alloy. First, mixture of silicon and one or more intermediate alloy elements chosen from the group which consists of Ba, Ca, Ce, Co, Cr, Cu, Er, Fe, Gd, Hf, Lu, Mg, Mn, Mo, Nb, Nd, Ni, P, Pd, Pr, Pt, Pu, Re, Rh, Ru, Sc, Sm, Sr, Ta, Te, Th, Ti, Tm, U, V, W, Y, Yb and Zr described in Table 1, so that the ratio of silicon to the whole is 10 to 98 atomic %, preferably 15 to 50 atomic %, is heated in a vacuum furnace, a non-oxidizing atmosphere furnace, etc., and is melt. Then, a granular silicon intermediate alloy is manufactured by the method of manufacturing a granule and a powdered silicon intermediate alloy by the atomizing method as shown in FIG. 5, or the method of obtaining a lump ingot by the ingot manufacturing process shown in FIG. 6, and then performing mechanical pulverization.

Figure 5:
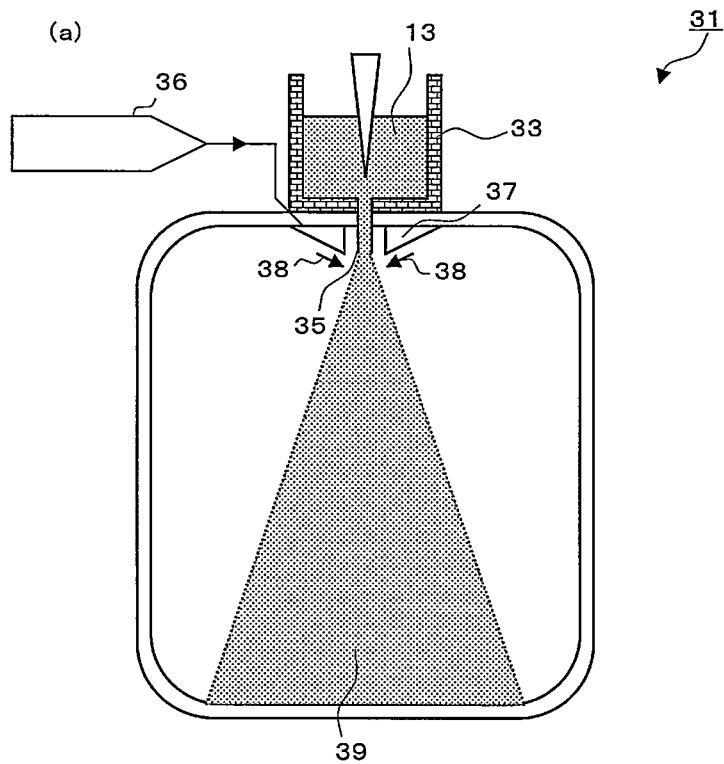
FIG. 5: (a) a figure showing gas atomization apparatus 31 of the present invention, (b) a figure showing rotation disk atomization apparatus 41 of the present invention.
Figure 5:
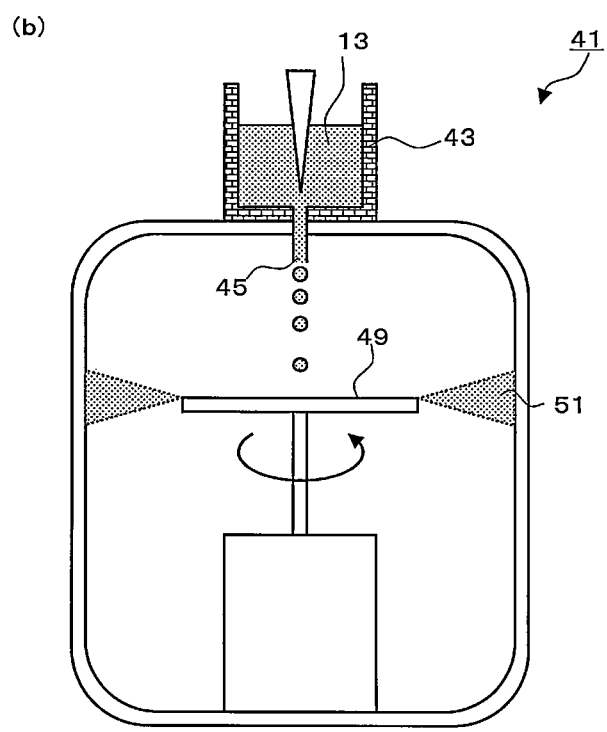

FIG. 5 (a) shows gas atomization apparatus 31 which can manufacture powdered silicon intermediate alloy 39 by the gas atomizing method. There is silicon alloy 13 of silicon and the intermediate alloy element which were melted by induction heating etc. in crucible 33. Jet flow 38 of the inactive gas from gas injection machine 37 is sprayed while this silicon alloy is dropped from nozzle 35. The molten metal of silicon alloy 13 is smashed, is solidified as a drop, and powdered silicon intermediate alloy 39 is formed.

FIG. 5 (b) shows rotation disk atomization apparatus 41 which can manufacture powdered silicon intermediate alloy 51 by the rotation disk atomizing method. There is silicon alloy 13 of the melted silicon and an intermediate alloy element in crucible 43. This silicon alloy is dropped from nozzle 45. The molten metal of silicon alloy 13 is dropped on rotation disk 49 which rotates at high speed, is applied shearing force to tangential direction, and is crushed, and powdered silicon intermediate alloy 51 is obtained.

Figure 6:
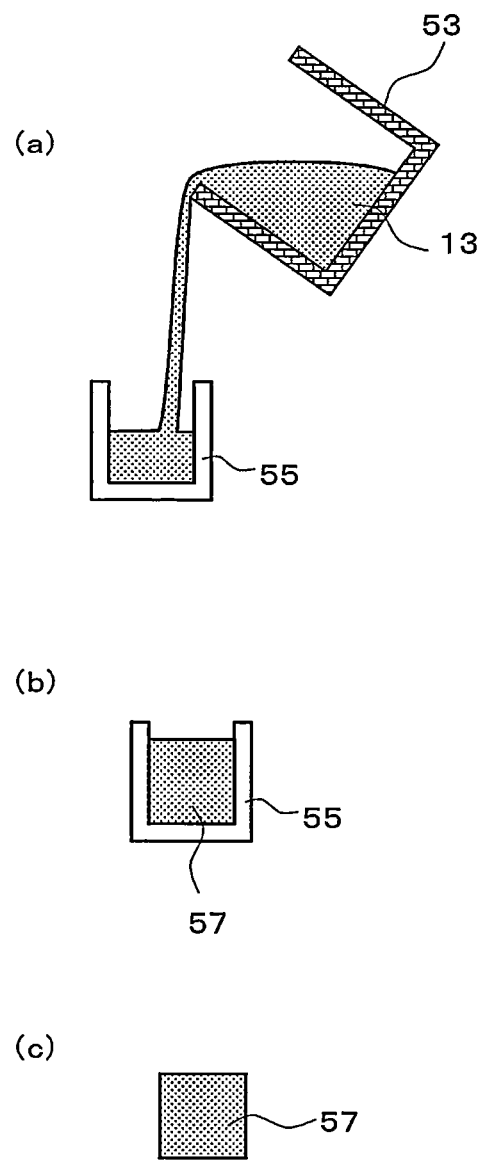
FIG. 6: (a) to (c) a figure explaining the manufacturing process of lump silicon intermediate alloy.

FIG. 6 is a figure explaining the process of forming lump silicon intermediate alloy 57 through an ingot manufacturing process. First, the molten metal of silicon alloy 13 is put into mold 55 from crucible 53. Then, after silicon alloy 13 is cooled and solidifies within mold 55, mold 55 is removed and lump silicon intermediate alloy 57 is obtained. Lump silicon intermediate alloy 57 is ground if needed, and a granular silicon intermediate alloy is obtained.

The thickness of a granular silicon intermediate alloy is 10 micrometers to 50 mm preferably, and is 0.1 to 10 mm more preferably, and is 1 to 5 mm further preferably. The cooling rate at the time of the solidification of a silicon alloy is 0.1K/s or more. It is not preferable that the thickness of a silicon intermediate alloy becomes thicker than 50 mm, because heat treatment time becomes long, and the particle diameter of porous silicon particle grows and becomes coarse. In that case, this silicon intermediate alloy shall be ground mechanically and shall be 50 mm or less.

Next, the silicon intermediate alloy is immersed in a molten metal of the molten metal element chosen from Ag, Al, Au, Be, Bi, Cd, Ga, In, Pb, Sb, Sn, Tl, and Zn in Table 1 corresponding to the used intermediate alloy element. The spinodal decomposition of silicon and the 2nd phase that is an alloy of the intermediate alloy element and the molten metal element is formed. It is desirable that the oxygen in this molten metal is reduced beforehand by 100 ppm or less, by 10 ppm or less preferably, by 2 ppm or less more preferably. This is because the dissolved oxygen and silicon in a molten metal react, silica is formed, silicon grows in the shape of a facet by using this as a core, and silicon becomes coarse. As a countermeasure, a molten metal may be reduced by solid reduction material, such as charcoal and graphite, and non-oxidizing gases, and an element with strong affinity with oxygen may be beforehand added to the molten metal. A silicon microparticle is formed for the first time at this immersion process.

Figure 7:
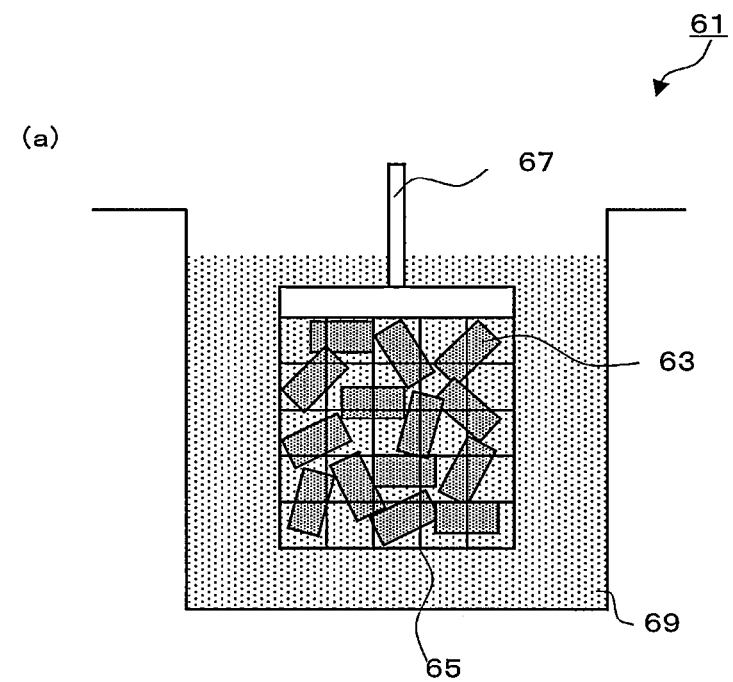
FIG. 7: (a), (b) a figure showing the molten metal immersion apparatus of the present invention.
Figure 7:
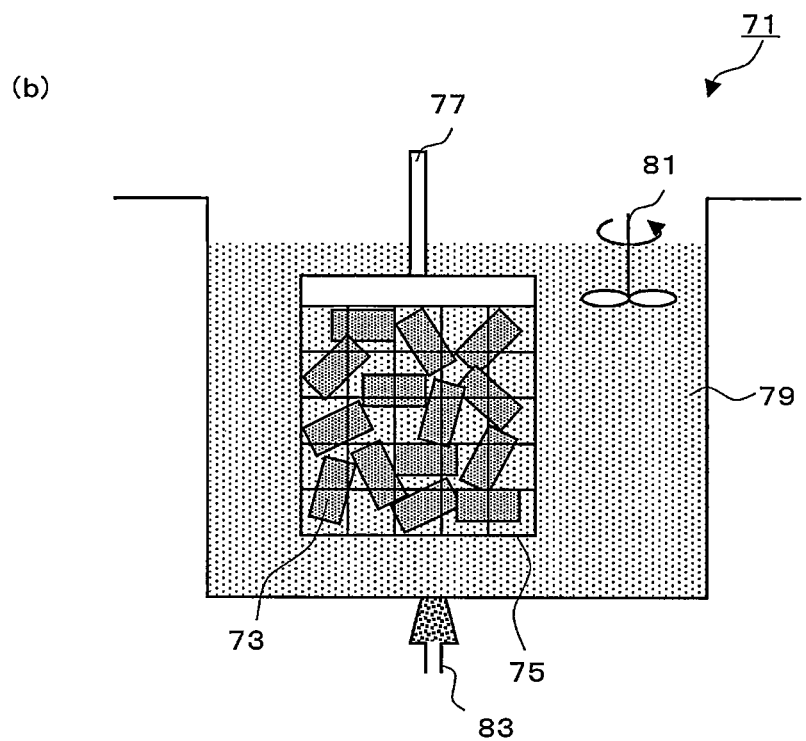

In an immersion process, using molten metal immersion apparatus 61 as shown in FIG. 7 (*a*), granular silicon intermediate alloy 63 is put into basket for immersion 65, and it is immersed in molten metal 69 of the molten metal element. The reaction can be advanced in a short time by giving a mechanical vibration to the silicon intermediate alloy or the molten metal through making forcing cylinder 67 go up and down as shown in FIG. 7 (*a*), by giving a vibration by an ultrasonic wave, or by stirring molten metal through mechanical stirring using mechanical stirrer 81, gas injection using gas blowing-in plug 83, or electromagnetic force as shown in FIG. 7 (*b*). Then, it is pulled up and cooled under non-oxidizing atmosphere. Molten metal 69 or 79 is heated by the temperature 10K higher than the liquidus temperature of a molten metal element. Although based also on molten metal temperature, the immersion time to molten metal is 5 seconds or more and 10000 seconds or less preferably. If immersed for 10000 seconds or more, a coarse Si grain will generate.

Then, like the above-mentioned manufacturing method, the 2nd phase is removed and a porous silicon particle is obtained.

(Effect of a Porous Silicon Particle)

According to the present invention, the porous silicon particle which has the three-dimensional mesh-like structure which did not exist in conventional material can be obtained.

According to the present invention, the porous silicon particle which has the almost uniform pore structure in the whole particle can be obtained. Since the deposit of the silicon microparticle from the silicon intermediate alloy within a molten metal is performed in a hot molten metal, and molten metal permeates to the inside of the particle.

The porous silicon particle of the present invention can obtain a long life-time negative electrode with high capacity, if it is used as a negative electrode active material of a lithium-ion battery.

(Complex Porous Silicon Particle)

(Composition of a Complex Porous Silicon Particle)

Figure 8:
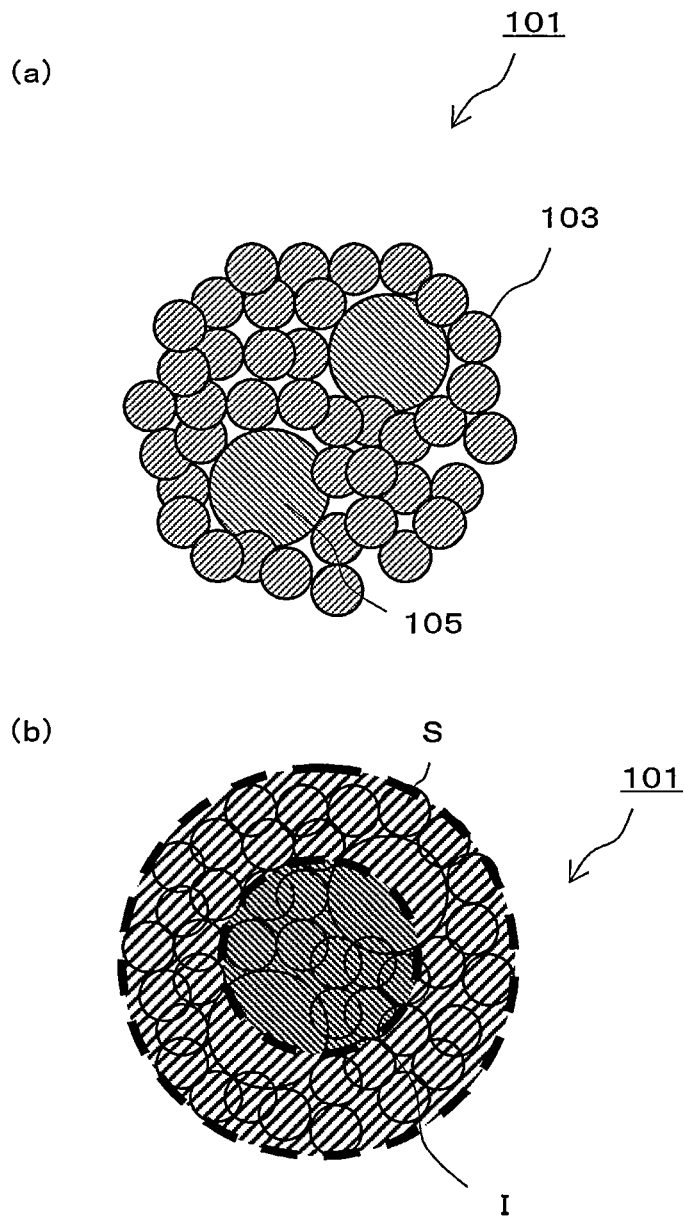
FIG. 8: (a) a figure showing complex porous silicon particle 101 of the present invention, (b) a figure showing a surface neighborhood domain S and a particle interior domain I of the complex porous silicon particle 101.

The complex porous silicon particle concerning the present invention is explained with reference to FIG. 8. As shown in FIG. 8 (*a*), complex porous silicon particle 101 of the present invention composes silicon microparticle 103 and silicon compound particles 105 that are joined together. The average particle diameter of complex porous silicon particle 101 is 0.1 micrometers to 1000 micrometers. The average porosity of complex porous silicon particle 101 is 15 to 93%. A complex porous silicon particle has a three-dimensional network structure which consists of continuous void.

The three-dimensional network structure in the present invention means structure which the hole has connected mutually, like the co-continuous structure caused in a spinodal decomposition process, or sponge structure. The pore size of the hole of a complex porous silicon particle is about 0.1 to 300 nm.

In the complex porous silicon particle, Xs/Xi which is a ratio of a porosity Xs of the surface neighborhood domain of more than 50% of a radial direction to a porosity Xi of the particle interior domain of less than 50% of a radial direction is 0.5 to 1.5. That is, the complex porous silicon particle of the present invention has the similar pore structure through the surface neighborhood domain and the particle interior domain, and has an almost uniform pore structure over the whole particle. The porosity Xs can be obtained by an SEM observation in the surface of complex porous silicon particle 101, and the porosity Xi can be obtained by an SEM observation in the cross-section of the particle interior domain of complex porous silicon particle 101.

The average particle diameter or the average pillar diameter of silicon microparticle 103 is 2 nm to 2 micrometers, preferably 20 to 300 nm or more preferably 10 to 500 nm. The average porosity is 15 to 93%, is 50 to 80% preferably, and is 60 to 70% more preferably. And the crystal structure of each silicon microparticle 103 is a single crystal which has crystallinity. Porous silicon microparticle 103 is characterized by being a solid particle which contains silicon of more than 80 atomic % in the ratio of elements except oxygen, and whose remainder is the intermediate element described later, a molten metal element, and other inescapable impurities.

As shown in FIG. 8 (*b*), complex porous silicon particle 101 is divided into a surface neighborhood domain S more than 50% of a radial direction and a particle interior domain I less than 50% of a radial direction. When Ds is the average particle diameter of silicon microparticles in the surface neighborhood domain of the complex porous silicon particle and Di is the average particle diameter of silicon microparticles in the particle interior domain of the complex porous silicon particle, Ds/Di is 0.5 to 1.5. The average particle diameter Ds is obtained by an SEM observation of the surface of complex porous silicon particle 1.

The average particle diameter Di is obtained by an SEM observation of the cross-section of the part corresponding to the particle interior domain of complex porous silicon particle 1.

The average particle diameter of silicon compound particles 105 is 50 nm to 50 micrometers, 100 nm to 20 micrometers preferably and is 200 nm to 10 micrometers more preferably. Silicon compound particles 105 are solid and crystalline particles which comprises a composite element chosen from the group consists of As, Ba, Ca, Ce, Co, Cr, Cu, Er, Fe, Gd, Hf, Lu, Mg, Mn, Mo, Nb, Nd, Ni, Os, Pr, Pt, Pu, Re, Rh, Ru, Sc, Sm, Sr, Ta, Te, Th, Ti, Tm, U, V, W, Y, Yb and Zr, silicon of 50 to 75 atomic %, the intermediate alloy element described later, a molten metal element, and other inescapable impurities. Silicon compound particles 105 are usually larger than silicon microparticle 103.

The surface of complex porous silicon particle 101, i.e. the silicon microparticle 103 or the silicon compound particles 105, can have an oxide layer of 20 nm or less in thickness or less than 10% of the particle diameter ratio of the silicon microparticle 103 or the silicon compound particles 105.

After removing the 2nd phase, the oxide layer of the surface of the complex porous silicon particle 101 can be formed by immersed in nitric acid of 0.0001 to 0.1N. Otherwise after removing the 2nd phase, the oxide layer can also be formed by holding under the oxygen partial pressure of 0.00000001 to 0.02 MPa. When these oxide layers of silicon etc. are formed, complex porous silicon particle 101 becomes very stable in the atmosphere, and becomes unnecessary to be used in a glove box etc.

Since the complex porous silicon particle of the present invention is usually aggregated, the average particle diameter means the average particle diameter of a primary particle. Measurement of a particle diameter uses together the picture information of an electron microscope (SEM), and a diameter of a volume standard median of a dynamic-light-scattering photometer (DLS). The average particle diameter can be measured by checking particle shape beforehand by an SEM image and determining particle diameters using image-analysis software (for example, "A-zo-kun" (registered trademark) by Asahi Kasei Engineering), and distributing particles in solvent and measuring by DLS (for example, DLS-8000 by Otsuka Electronics). If particles are fully distributing and are not aggregating at the time of DLS measurement, the almost same measurement result is obtained by SEM and DLS. Since the silicon microparticles and the silicon composite particle forming a complex porous silicon particle have joined mutually, the average particle diameter is mainly determined using a surface scanning electron microscope or a transmission electron microscope.

For an average pillar diameter, a pillar diameter is defined as a diameter of the pillar of a cylindrical (pillar-shaped) silicon particle having an aspect ratio over 5. The average value of this pillar diameter is an average pillar diameter. This pillar diameter mainly determined by performing an SEM observation of particles.

The average porosity is the ratio of a void in particles. Although the fine pores below a submicron can be measured by a nitrogen gas adsorption method, pore size distributing broadly can be measured by an electron microscope observation or a mercury press-in (JIS R 1655 "Test methods for pore size distribution of fine ceramic green body by mercury porosimetry", derived from the relations pressure and volume of mercury when mercury intrudes in a pore a gas adsorption method JIS Z 8830:2001 "Determination of the of powders by gas adsorption method") etc. BET specific surface area is measurable by a nitrogen gas adsorption process.

Complex porous silicon particle 101 of the present invention has particle diameter of 0.1 micrometers to 1000 micrometers with Si concentration of Si intermediate alloy, or the cooling rate at the time of the intermediate alloy production. Particle diameter becomes small by making Si concentration low, otherwise carrying out a cooling rate early. When using it as an active material for negative electrodes, it is preferred that the average particle diameter is 0.1 to 50 micrometers, and it is preferred that they are 1 to 30 micrometers and also 5 to 20 micrometers more preferably. Therefore, when a complex porous silicon particle is too small, it is used as an aggregate or a granulated body. When a complex porous silicon particle is too large, it is satisfactory even if this complex porous silicon particle is roughly ground.

(Outline of the Manufacturing Method of a Porous Silicon Particle)

Figure 9:
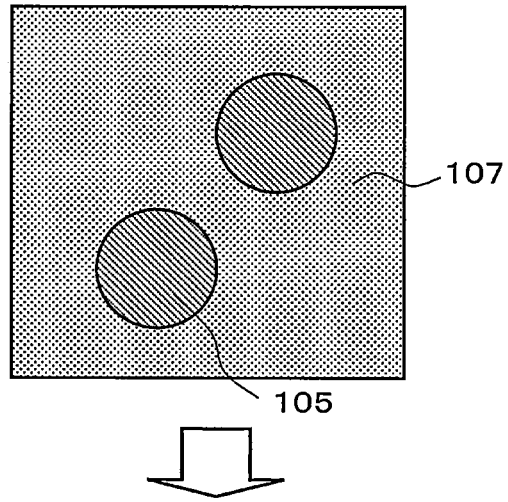
FIG. 9: (a) to (c) a figure showing the outline of the 1st manufacturing method of a complex porous silicon particle 101.
Figure 9:
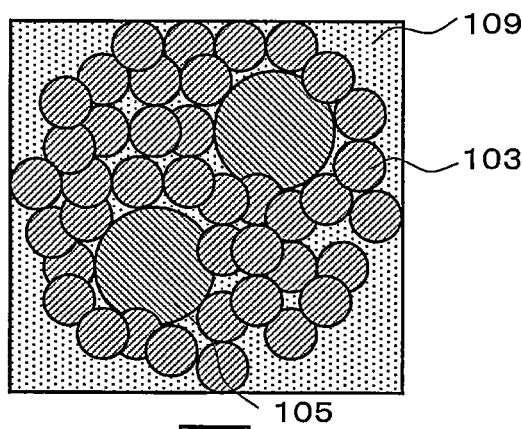
Figure 9:
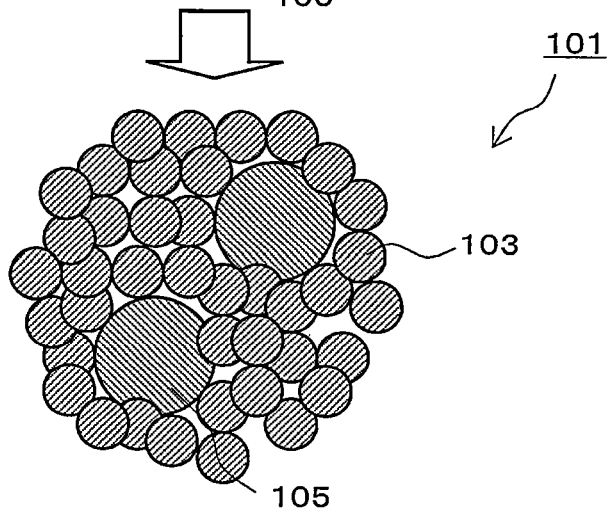

The outline of the manufacturing method of complex porous silicon particle 101 is explained using FIG. 9.

First, as shown in FIG. 9 (a), silicon, an intermediate alloy element and a composite element are heated and melted and silicon intermediate alloy 107 is produced. On this occasion, if silicon, a composite element, and an intermediate alloy element are melted and solidified, intermediate alloy 107 of silicon, a composite element, and an intermediate alloy element, and the silicon compound particles which consist of silicon and a composite element will be formed.

Then, silicon intermediate alloy 107 is immersed in a molten metal of the molten metal element. If silicon intermediate alloy 107 is immersed into a melting metal bath, a molten metal element will permeate into silicon intermediate alloy 107. On this occasion, an intermediate alloy element forms solid alloy phase with a molten metal element, and also the liquid phase is formed because a molten metal element permeates. A silicon atom and a composite element are left behind in this liquid phase region. When this silicon atom and composite element aggregate from the situation where it was spread, silicon microparticle 103 deposits, the network of the alloy of a silicon atom and a composite element is made, and the three-dimensional network structure is formed. That is, as shown in FIG. 9 (b), the intermediate alloy element of silicon intermediate alloy 107 elutes in the molten metal and forms the 2nd phase 109, and silicon is deposited as silicon microparticle 103. The 2nd phase 109 comprises an alloy of the intermediate alloy element and the molten metal element, or the molten metal element replacing the intermediate alloy element. Silicon compound particles 105 remain without being influenced by the molten metal of the molten metal element. These silicon microparticles 103 join mutually and form three-dimensional network structure.

In the immersion process to a melting metal bath, the silicon primary crystal of only silicon or the compound of and silicon and the composite element does not cause re-aggregation of a silicon atom or a composite element, even if a molten metal element permeates, but the silicon primary crystal or the compound of the composite element remains as it is. Therefore, it is preferred to raise the cooling rate at the time of production of silicon intermediate alloy 107, and to carry out these particle diameter controls.

Then, as shown in FIG. 9 (c), after the 2nd phase 109 is removed by methods, such as dealloying using acid, alkali, etc., complex porous silicon particle 101 which consists of joined silicon microparticle 103 and silicon composite particle is obtained.

From the above processes, the following conditions are required for an intermediate alloy element, a composite element and a molten metal element.

Condition 1: the melting point of the molten metal element is lower than the melting point of silicon over 50K.

If the melting point of the molten metal element and the melting point of silicon are near, since silicon dissolves into a molten metal, when a silicon intermediate alloy is immersed in the molten metal of the molten metal element, condition 1 are required.

Condition 2: when silicon and the intermediate alloy element are solidified, Si primary crystal should not come out.

When forming silicon and an alloy of the intermediate alloy element and silicon concentration increases, in a hypereutectic region, a coarse silicon primary crystal will be formed. In this silicon primary crystal, Diffusion and re-aggregation of silicon atoms in an immersion process do not occur, and formation of the three-dimensional network structure does not occur.

Condition 3: the solubility of silicon to the molten metal element is lower than 5 atomic %.

This is to prevent the 2nd phase containing silicon, when the intermediate alloy element and the molten metal element form the 2nd phase.

Condition 4: the intermediate alloy element and the molten metal element should not separate into two phases.

When intermediate alloy element and a molten metal element separate into two phases, an intermediate alloy element is not separated from a silicon intermediate alloy, and diffusion and re-aggregation of a silicon atom do not occur. Even if it performs processing by acid, an intermediate alloy element will remain into silicon particles.

Condition 5: silicon and the composite element should not separate into two phases.

When silicon and the composite element are easy to divide into two phases, the silicon compound particles that consist of an alloy of silicon and a composite element are not obtained.

mum content in Table 2 corresponding to each intermediate alloy element according to the ratio of an intermediate alloy element is used when two or more intermediate alloy elements were contained) in the following Table 2 corresponding to the intermediate alloy element. When two or more intermediate alloy elements are contained, the composite element and the molten metal element that are usable in common with each intermediate alloy element are used.

TABLE 2

| Intermediate alloy element | Si maximum content | Composite elements | Molten metal elements | Porosity (%) |
|---|---|---|---|---|
| Co | 77 | As, Ba, Ca, Ce, Cr, Er, Fe, Gd, Hf, Mn, Mo, Nb, Nd, Ni, Os, Pr, Pt, Pu, Re, Rh, Ru, Sc, Sm, Sr, Ta, Te, Th, Ti, Tm, U, V, W, Y, Yb, Zr | Al, Be, Ga, In, Sb, Sn, Zn | 15~84 |
| Cr | 80 | As, Ba, Ca, Ce, Co, Cu, Er, Fe, Gd, Hf, Lu, Mn, Mo, Nb, Nd, Ni, Os, Pr, Pt, Pu, Re, Rh, Ru, Sc, Sm, Sr, Ta, Te, Th, Ti, Tm, U, V, W, Y, Yb, Zr | Al, Be, Ga, Sb, Zn | 15~85 |
| Cu | 30 | As, Ba, Ca, Ce, Co, Cr, Er, Fe, Gd, Hf, Mn, Mo, Nb, Nd, Ni, Os, Pr, Pt, Pu, Re, Rh, Ru, Sc, Sm, Sr, Ta, Te, Th, Ti, Tm, U, V, W, Y, Yb, Zr | Al, Be, Cd, Ga, In, Sb, Sn, Zn | 47~85 |
| Fe | 67 | As, Ba, Ca, Ce, Cr, Cu, Co, Er, Gd, Hf, Mg, Mn, Mo, Nb, Nd, Ni, Os, Pr, Pt, Pu, Re, Rh, Ru, Sc, Sm, Sr, Ta, Te, Th, Ti, Tm, U, V, W, Y, Yb, Zr | Ag, Al, Au, Be, Bi, Ga, In, Pb, Sb, Sn, Tl, Zn | 15~85 |
| Mg | 50 | As, Ba, Ca, Ce, Cr, Co, Er, Fe, Gd, Hf, Mn, Mo, Nb, Nd, Ni, Os, Pr, Pt, Pu, Re, Rh, Ru, Sc, Sm, Sr, Ta, Te, Th, Ti, Tm, U, V, W, Y, Yb, Zr | Ag, Al, Au, Be, Bi, Ga, In, Pb, Sb, Sn, Tl, Zn | 42~92 |
| Mn | 67 | As, Ba, Ca, Ce, Cr, Co, Er, Fe, Gd, Hf, Mo, Nb, Nd, Ni, Os, Pr, Pt, Pu, Re, Rh, Ru, Sc, Sm, Sr, Ta, Te, Th, Ti, Tm, U, V, W, Y, Yb, Zr | Ag, Al, Au, Bi, Ga, In, Sb, Sn, Zn | 15~85 |
| Mo | 80 | As, Ba, Ca, Ce, Cr, Co, Er, Fe, Gd, Hf, Lu, Mg, Mn, Nb, Nd, Ni, Os, Pr, Pt, Pr, Pu, Re, Rh, Ru, Sc, Sm, Sr, Ta, Te, Th, Ti, Tm, U, V, W, Y, Yb, Zr | Al, Be, Ga, Sb, Sn, Zn | 15~88 |
| Ni | 55 | As, Ba, Ca, Ce, Cr, Co, Er, Fe, Gd, Hf, Mn, Mo, Nb, Nd, Os, Pr, Pt, Pu, Re, Rh, Ru, Sc, Sm, Sr, Ta, Te, Th, Ti, Tm, U, V, W, Y, Yb, Zr | Al, Be, Cd, Ga, In, Sb, Sn, Zn | 50~75 |
| P | 50 | As, Ba, Ca, Ce, Cr, Co, Er, Fe, Gd, Hf, Mn, Mo, Nb, Nd, Ni, Os, Pr, Pt, Pu, Re, Rh, Ru, Sc, Sm, Sr, Ta, Te, Th, Ti, Tm, U, V, W, Y, Yb, Zr | Ag, Al, Au, Cd, Ga, In, Sn, Zn | 50~75 |
| Ti | 80 | As, Ba, Ca, Ce, Cr, Co, Er, Fe, Gd, Hf, Lu, Mg, Mn, Mo, Nb, Nd, Ni, Os, Pr, Pt, Pu, Re, Rh, Ru, Sc, Sm, Sr, Ta, Te, Th, Tm, U, V, W, Y, Yb, Zr | Ag, Al, Au, Be, Bi, Cd, Ga, In, Pb, Sb, Sn, Zn | 50~75 |
| Zr | 80 | As, Ba, Ca, Ce, Cr, Co, Er, Fe, Gd, Hf, Mg, Mn, Mo, Nb, Nd, Ni, Os, Pr, Pt, Pu, Re, Rh, Ru, Sc, Sm, Sr, Ta, Te, Th, Ti, Tm, U, V, W, Y, Yb | Ag, Al, Au, Be, Bi, Cd, Ga, In, Pb, Sb, Sn, Zn | 50~75 |

Condition 6: the intermediate alloy element corresponding to the molten metal element should not contain the composite element in a selectable element.

If the composite element is an element selectable as the intermediate alloy element and has the above-mentioned feature of the intermediate alloy element, the molten metal element and the composite element form the 2nd phase, and the composite element will be removed when performing process by acid.

When the above conditions 1 to 6 are taken into consideration, the combination of an intermediate alloy element, a composite element, and a molten metal element usable in order to produce a complex porous silicon particle, and the obtained porosity of a complex porous silicon particle are as follows. The ratio of the composite element is 1 to 33 atomic % of silicon. The ratio of silicon is 10 or more atomic % to the sum of silicon, an intermediate alloy element, and said composite element, and is below the value of the Si maximum content (the value which divided proportionally the Si maxi- In process of forming silicon intermediate alloy 107, Silicon (X atomic %), an intermediate alloy element (Y atomic %), and one or more composite elements ($Z_1$, $Z_2$, $Z_3$, . . . atomic %) produces a silicon intermediate alloy which has the composition which satisfies the following formulas. The [Si maximum content] is the Si maximum content in Table 2 corresponding to an intermediate alloy element to contain. When there are two or more intermediate alloy elements, the [Si maximum content] is the value which divided proportionally the Si maximum content of each intermediate alloy element at a ratio of each intermediate alloy element. When there are two or more intermediate alloy elements, Y atomic % is the sum of the ratio of two or more intermediate alloy elements.

$$10 \leq X < [\text{Si maximum content}] \quad \text{formula (1)}$$

$$10 \leq a/(a+Y) \times 100 \leq [\text{Si maximum content}] \quad \text{formula (2)}$$

Note: $a = X - 1.5 \times (Z_1 + Z_2 + Z_3, \ldots)$ (The 1St Manufacturing Method of a Complex Porous Silicon Particle)

The manufacturing method of the complex porous silicon particle concerning the present invention is explained. Although it explains using the apparatus used with the manufacturing method of a porous silicon particle and the same numerals are given to each intermediate alloy below, the intermediate alloy for manufacturing a complex porous silicon particle differs from the intermediate alloy for manufacturing a porous silicon particle in a point containing a composite element.

First, using silicon, one or more intermediate alloy elements chosen from the group which consists of Co, Cr, Cu, Fe, Mg, Mn, Mo, Ni, P, Ti and Zr and one or more composite elements in Table 2 corresponding to an intermediate alloy element, mixture of silicon, the intermediate alloy element and the composite element is heated in a vacuum furnace, etc., and is melt. On this occasion, the alloy of silicon and the intermediate alloy element, and the compound of silicon and the composite element are formed.

Then, for example, using single roll casting machine 11 as shown in FIG. 3, melted silicon alloy 13 is dropped from crucible 15, and is solidified touching rotating steel rolls 17, and a ribbon shaped silicon intermediate alloy 19 or a line shaped silicon intermediate alloy is manufactured. Cooling rates at the time of the solidification of a silicon intermediate alloy is 10K/s or more, preferably it is 100K/s or more, and more preferably it is 200K/s or more. This high-speed cooling rate micro-organizationally contributes to make the silicon compound particles smaller when they are generated in early stages of solidification. Making the size of silicon compound particles small contributes to shortening the heat treatment time in a next process. The thickness of ribbon shape silicon intermediate alloy 19, or a line shape silicon intermediate alloy is 0.1 micrometers to 2 mm, is 0.1 to 500 micrometers preferably, and is 0.1 to 50 micrometers more preferably. Or a silicon intermediate alloy may be manufactured as the shape of a piece of foil which has fixed length unlike a line or a ribbon shape.

Next, a silicon intermediate alloy is immersed in a metal bath of one or more molten metal elements chosen from Ag, Al, Au, Be, Bi, Cd, Ga, In, Pb, Sb, Sn, Tl, and Zn corresponding to the intermediate alloy element in Table 2. The spinodal decomposition of Si of a silicon microparticle and the 2nd phase that is an alloy of an intermediate alloy element and a molten metal element, or the 2nd phase that comprises a said molten metal element replacing the intermediate alloy element are formed. In an immersion process, for example using molten metal immersion apparatus 21 as shown in FIG. 4, ribbon shape silicon intermediate alloy 19 or a line shape silicon intermediate alloy is immersed in molten metal 23 of a molten metal element. Then, it is obtained as roll through sink roll 25 or support roll 27. Molten metal 23 is heated to 10K higher temperature than the liquidus temperature of a molten metal element. Although based on molten metal temperature, the immersion time to molten metal is 5 seconds or more and 10000 seconds or less preferably. If immersed for 10000 seconds or more, a coarse Si grain will generate. Ribbon shape silicon intermediate alloy 19 after immersion is cooled under non-oxidizing atmosphere, and the complex of silicon microparticle 103, silicon compound particles 105, and 2nd phase 109 is obtained.

Then, the 2nd phase 109 that is an alloy of an intermediate alloy element and a molten metal element, or the 2nd phase 109 that comprises a said molten metal element replacing the intermediate alloy element are dissolved by at least one of acid, alkali, and an organic solvent, and only the 2nd phase 109 is removed, washed and dried. As acid, what is necessary is just acid which dissolves the intermediate alloy element and a molten metal element, and does not dissolve silicon, and nitric acid, hydrochloric acid, sulfuric acid, etc. are mentioned. Or heating and decompression of this 2nd phase 109 is carried out, and only that 2nd phase is removed by carrying out evaporation removal.

Since the coarse aggregate of complex porous silicon particle 101 is obtained after removing the 2nd phase 109, it is ground by a ball mill etc. and the average particle diameter of the aggregate is set to 0.1 micrometers to 20 micrometers.

(Other Examples of the Manufacturing Method of a Porous Silicon Particle)

As other examples of the manufacturing method of complex porous silicon particle 1, a line or ribbon shape silicon intermediate alloy 19 may be replaced with a powdered, a granular and a lump silicon intermediate alloy.

First, using silicon, one or more intermediate alloy elements chosen from the group which consists of Co, Cr, Cu, Fe, Mg, Mn, Mo, Ni, P, Ti and Zr and one or more composite elements in Table 2 corresponding to the intermediate alloy element, mixture of silicon, the intermediate alloy element and the composite element is heated and melt in a vacuum furnace, etc.

Then, a powder, a granule or a lump shape silicon intermediate alloy is manufactured by the method of manufacturing a granule and a powdered silicon intermediate alloy by the atomizing method as shown in FIG. 5 (a) and (b), or the method of obtaining a lump ingot by the ingot manufacturing process shown in FIG. 6, and then performing mechanical pulverization as necessary.

FIG. 5 (a) shows gas atomization apparatus 31 which can manufacture powdered silicon intermediate alloy 39 by the gas atomizing method. There is silicon alloy 13 of the silicon, the intermediate alloy element and the composite element that are melted by induction heating etc. in crucible 33. While this silicon alloy 13 is dropped from nozzle 35, gas jet flow 38 from gas injection machine 37 supplied with jet gas 36, such as inactive gas and air, is sprayed. The molten metal of silicon alloy 13 is crushed and solidified as a drop, and powdered silicon intermediate alloy 39 is formed.

FIG. 5 (b) shows rotation disk atomization apparatus 41 which can manufacture powdered silicon intermediate alloy 51 by the rotation disk atomizing method. There is silicon alloy 13 of the melted silicon, the intermediate alloy element and the composite element in crucible 43. This silicon alloy is dropped from nozzle 45. The molten metal of silicon alloy 13 is dropped on rotation disk 49 which rotates at high speed, is applied shearing force to tangential direction, and is crushed, and powdered silicon intermediate alloy 51 is formed.

FIG. 6 is a figure explaining the process of forming lump silicon intermediate alloy 57 through an ingot manufacturing process. First, the molten metal of silicon alloy 13 is put into mold 55 from crucible 53. Then, after silicon alloy 13 is cooled and solidifies within mold 55, mold 55 is removed and lump silicon intermediate alloy 57 is obtained. Lump silicon intermediate alloy 57 may be used as it is, or it may be ground if needed and may be used as a granular silicon intermediate alloy.

The particle diameter of a powder, a granule or a lump shape silicon intermediate alloy is 10 micrometers to 50 mm preferably, and is 0.1 to 10 mm more preferably, and is 1 to 5 mm further preferably. The cooling rate at the time of the solidification of a silicon alloy is 0.1K/s or more. It is not preferable that the thickness of a silicon intermediate alloy becomes thicker than 50 mm, because heat treatment time becomes long, and the particle diameter of a complex porous silicon particle grows and becomes coarse. In that case, mechanical pulverization can be given to this silicon intermediate alloy, and thickness can be 50 mm or less.

Next, the silicon intermediate alloy is immersed in a molten metal of a molten metal element described in Table 2 corresponding to the used intermediate alloy element. The spinodal decomposition of silicon and the 2nd phase that is an alloy of an intermediate alloy element and a molten metal element is formed. It is desirable that the oxygen in this molten metal is reduced beforehand by 100 ppm or less, by 10 ppm or less preferably, by 2 ppm or less more preferably. This is because the dissolved oxygen and silicon in the molten metal react, silica is formed, silicon grows in the shape of a facet by using this as a core, and silicon becomes coarse. As a countermeasure, a molten metal may be reduced by solid reduction material, such as charcoal and graphite, and non-oxidizing gases, and an element with strong affinity with oxygen may be beforehand added to the molten metal. A silicon microparticle is formed for the first time at this immersion process.

In an immersion process, using molten metal immersion apparatus 61 as shown in FIG. 7 (*a*), granular silicon intermediate alloy 63 is put into basket for immersion 65, and it is immersed in molten metal 69 of a molten metal element. The reaction can be advanced in a short time by giving a mechanical vibration to the silicon intermediate alloy or the molten metal through making forcing cylinder 67 go up and down as shown in FIG. 7 (*a*), by giving a vibration by an ultrasonic wave, or by stirring molten metal through mechanical stirring using mechanical stirrer 81, gas injection using gas blowing-in plug 83, or electromagnetism as shown in FIG. 7 (*b*). Then, it is pulled up and cooled under non-oxidizing atmosphere. Molten metal 69 or 79 is heated by the temperature 10K higher than the liquidus temperature of a molten metal element. Although based also on molten metal temperature, the immersion time to molten metal is 5 seconds or more and 10000 seconds or less preferably. If immersed for 10000 seconds or more, a coarse Si grain will generate. For the above-mentioned powder, granule or lump shape of a silicon intermediate alloy, the silicon intermediate alloy having the shape with small aspect ratio (five or less aspect ratio) is called as a powder, a granule or a lump depending on the size, and they are not defined strictly. About granular silicon intermediate alloys 63, 73, and 93, it is written as the granular silicon intermediate alloy on behalf of the above-mentioned powder, granule, or lump shape silicon intermediate alloy.

Then, like the above-mentioned manufacturing method, the 2nd phase is removed and a complex porous silicon particle is obtained.

(The 2Nd Manufacturing Method of a Complex Porous Silicon Particle)

Figure 10:
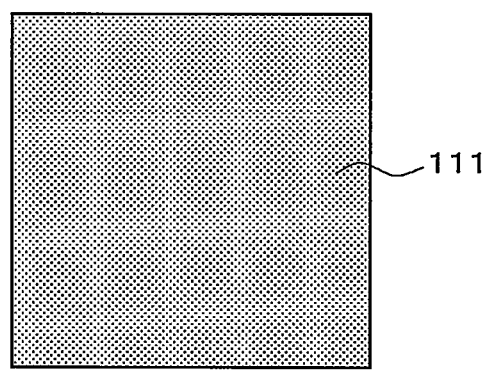
FIG. 10: (a) to (c) a figure showing the outline of the 2nd manufacturing method of a complex porous silicon particle 101.
Figure 10:
Figure 10:
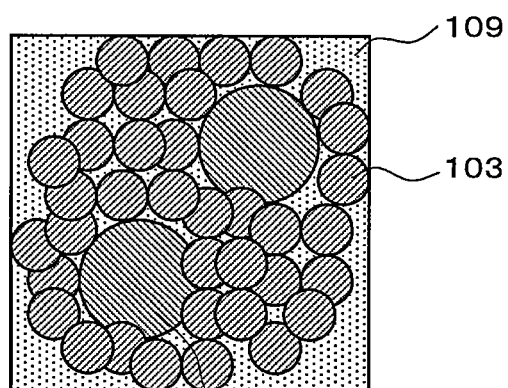
Figure 10:
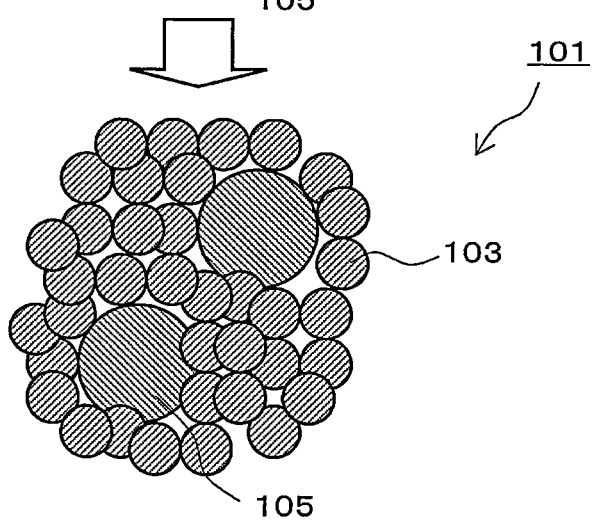

The 2nd manufacturing method of the complex porous silicon particle of the present invention is explained. In the 2nd manufacturing method, as shown in FIG. 10 (*a*), silicon intermediate alloy 111 which consists of silicon and the intermediate alloy element is formed. Then, as shown in FIG. 10 (*b*), by immersing in the molten metal which is added the composite element to the molten metal element, silicon microparticle 103, silicon compound particles 105, and the 2nd phase 109 are formed. Then, as shown in FIG. 10 (*c*), the 2nd phase 109 is removed and complex porous silicon particle 101 is obtained.

Hereafter, the 2nd manufacturing method is explained in detail.

First, the powder of silicon and the powder of one or more intermediate alloy elements chosen from the group which consists of Co, Cr, Cu, Fe, Mg, Mn, Mo, Ni, P, Ti, and Zr described in Table 2 are melted so that silicon (X atomic %) and intermediate alloy element (Y atomic %) satisfies a formula (3).

$$X/(X+Y) \times 100 \leq [\text{Si maximum content}] \qquad (3)$$

Then, the ribbon shape silicon intermediate alloy 19 or the line silicon intermediate alloy which is an alloy of silicon and an intermediate alloy element is manufactured like the 1st manufacturing method using single roll casting machine 11 etc. as shown in FIG. 3. Or a powdered silicon intermediate alloy is manufactured by the atomizing method as shown in FIG. 5 (*a*) and (*b*). As shown in FIG. 6, ingot casting of the silicon intermediate alloy is carried out, and this may be ground mechanically and may be made granular.

Next, a silicon intermediate alloy is immersed in the alloy bath of one or more molten metal element chosen from Ag, Al, Au, Be, Bi, Cd, Ga, In, Pb, Sb, Sn, Tl, and Zn in Table 2 corresponding to the intermediate alloy element, the alloy bath contains one or more composite elements corresponding to said intermediate alloy element in Table 2, each composite element is below 10 atomic % and sum of them is below 20 atomic %. The spinodal decomposition of Si, the formation of compound of silicon and the composite element, and the 2nd phase that is an alloy of the intermediate alloy element and the molten metal element, and/or the 2nd phase that comprises said molten metal element replacing the intermediate alloy element are formed. An immersion process is performed by immersing a ribbon shape silicon intermediate alloy 19 or a line silicon intermediate alloy into molten metal 23 of the molten metal element using molten metal immersion apparatus 21 as shown in FIG. 4, or immersing the granular silicon intermediate alloy into molten metal of the molten metal element using a molten metal immersion apparatus or a molten metal treatment device as shows in FIG. 7. Molten metal 23 is heated to 10K higher temperature than the liquidus temperature of a molten metal element. Although based on molten metal temperature, the immersion time to molten metal is 5 seconds or more and 10000 seconds or less preferably. If immersed for 10000 seconds or more, a coarse Si grain will generate. This is cooled under non-oxidizing atmosphere and the complex of silicon microparticle 103, silicon compound particles 105, and the 2nd phase 109 is obtained.

After this silicon intermediate alloy was immersed in a bath of the molten metal element in Table 2 corresponding to an intermediate alloy element, it may be immersed in the alloy bath of the molten metal element in Table 2 corresponding to an intermediate alloy element, the alloy bath contains one or more composite elements corresponding to said intermediate alloy element in Table 2, each composite element is below 10 atomic % and sum of them is below 20 atomic %.

Then, like the above-mentioned 1st manufacturing method, the 2nd phase 109 is removed and complex porous silicon particle 101 is obtained.

(Effect of a Complex Porous Silicon Particle)

According to the present invention, the complex porous silicon particle which has the three-dimensional mesh-like structure which did not exist in conventional material can be obtained.

According to the present invention, the complex porous silicon particle which has almost uniform pore structure in the whole particle can be obtained. Since the deposit of the silicon microparticle from the silicon intermediate alloy within a molten metal is performed in a hot molten metal, molten metal permeates to the particle inside.

The complex porous silicon particle of the present invention can become a long life-time negative electrode with high capacity, if it is used as a negative electrode active material of a lithium-ion battery. In particular, at the time of the occlusion of a lithium ion, since the composite element is an element which cannot carry out occlusion of the lithium easily compared with silicon, since the composite element does not expand easily, expansion of silicon is controlled and a longer life time negative electrode can be obtained. Since the silicon compound particles that are the compounds of silicon and a composite element have high conductivity compared with silicon, the complex porous silicon particle of the present invention can achieve rapid charge and discharge compared with usual silicon particles.

EXAMPLE

Hereafter, the present invention is explained in detail using an example and a comparative example. Examples 1-1 to 1-16 is an example about the porous silicon particles, and examples 2-1 to 2-16 is an example about the complex porous silicon particle containing a composite element.

Example 1

Example 1-1

Silicon (lump shape, purity: more than 95.0%) and cobalt were blended at a ratio of Si:Co=55:45 (atomic %), and this was melted at 1480 degrees Celsius in a vacuum furnace. Then, it was cooled rapidly by cooling-rate of 800K/s using the single roll casting machine, and the ribbon made of a silicon alloy which has thickness of 200 micrometers was produced. This was immersed in tin molten metal of 940 degrees Celsius for 1 minute, immediately it was cooled rapidly with argon gas. By this process, 2 phase complex of the 2nd phase that comprises Si and Co—Sn or Sn was obtained. This 2 phase complex was immersed in 20% nitric acid solution for 5 minutes, and porous silicon particles were obtained.

Examples 1-2 to 1-11

The manufacturing conditions of each example and a comparative example were summarized in Table 3. In examples 1-2 to 1-11, the complex porous silicon was obtained through manufacturing conditions shown in Table 3, such as a compounding ratio of an intermediate alloy element and each element, and other conditions being similar to the method of example 1-1.

Example 1-12

Silicon (lump shape, purity: more than 95.0%) and magnesium were blended at a ratio of Si:Mg=12:88 (atomic %), and this was melted at 1090 degrees Celsius in a vacuum furnace in which argon gas substitute the inside. Then, after making it cast and solidify in a mold, it ground mechanically and an ingot made of a silicon alloy of the size of a 5-mm square was produced. Immediately after making this immersed in a 470 degrees Celsius lead molten metal for 30 minutes, it cooled rapidly with argon gas. By this process, 2 phase complex of the 2nd phase that comprises Si and Mg—Pb or Pb was obtained. This 2 phase complex was immersed in 20% nitric acid solution for 180 minutes, and porous silicon particles were obtained.

Examples 1-13 to 1-16

In examples 1-13 to 1-16, the complex porous silicon was obtained through manufacturing conditions shown in Table 3, such as a compounding ratio of an intermediate alloy element and each element, and other conditions are similar to the method of example 1-12.

Comparative Example 1-1

Silicon powder and magnesium powder were blended at a ratio of Si:Mg=55:45 (atomic %), and this was melted at 1087 degrees Celsius in argon atmosphere. Then, it was cooled rapidly by cooling-rate of 200K/s using the double roll casting machine, and a tape made of a silicon alloy which has thickness of 1 micrometer was produced. This was immersed in the bismuth molten metal of 500 degrees Celsius for 30 minutes, immediately it was cooled rapidly with argon gas. This complex was immersed in 20% nitric acid solution for 180 minutes.

Comparative Example 1-2

The silicon particle (SIE23PB, by Kojundo Chemical Laboratory) with an average particle diameter of 5 micrometers was etched using the mixed acid which is mix of nitric acid of 25 mass % and hydrofluoric acid of 20 mass %, and was filtered, and the porous silicon particle was obtained.

Comparative Example 1-3

The silicon particle (SIE23PB, by Kojundo Chemical Laboratory) with an average particle diameter of 5 micrometers was used.

TABLE 3

| | | | Silicon intermediate alloy manufacturing porcess | | | | | | Molten metal immersing Process | |
| --- | --- | --- | --- | --- | --- | --- | --- | --- | --- | --- |
| | | Intermediate alloy element | Si content [at %] | Melting atomosphere | Melting temperature [° C.] | Cooling rate [K/s] | Shape | Thickness or size | Molten metal element | Molten metal temperature [° C.] |
| Example | 1-1 | Co | 55 | Vacuum | 1480 | 800 | Ribbon | 200 μm | Tin | 940 |
| | 1-2 | Cr | 47 | Vacuum | 1610 | 800 | Ribbon | 500 μm | Antimony | 1120 |
| | 1-3 | Cu | 25 | Vacuum | 900 | 200 | Ribbon | 30 μm | Zinc | 500 |
| | 1-4 | Fe | 54 | Vacuum | 1415 | 800 | Ribbon | 100 μm | Antimony | 1120 |
| | 1-5 | Mg | 30 | Argon | 1087 | 200 | Ribbon | 100 μm | Bismuth | 500 |
| | 1-6 | Mn | 52 | Vacuum | 1290 | 300 | Ribbon | 60 μm | Indium | 920 |
| | 1-7 | Mo | 55 | Vacuum | 1920 | 800 | Ribbon | 150 μm | Gallium | 1350 |
| | 1-8 | Ni | 50 | Vacuum | 1005 | 800 | Ribbon | 300 μm | Tin | 820 |

TABLE 3-continued

| | | Silicon intermediate alloy manufacturing porcess | | | | | | Molten metal immersing Process | |
|---|---|---|---|---|---|---|---|---|---|
| | | Intermediate alloy element | Si content [at %] | Melting atomosphere | Melting temperature [° C.] | Cooling rate [K/s] | Shape | Thickness or size | Molten metal element | Molten metal temperature [° C.] |
| | 1-9 | P | 40 | Argon | 1450 | 300 | Ribbon | 40 μm | Cadmium | 750 |
| | 1-10 | Ti | 61 | Vacuum | 1750 | 400 | Ribbon | 120 μm | Tin | 1360 |
| | 1-11 | Zr | 57 | Vacuum | 2280 | 500 | Ribbon | 600 μm | Bismuth | 1310 |
| | 1-12 | Mg | 12 | Argon | 1090 | 2 | Mass | 5 mm square | Lead | 470 |
| | 1-13 | Mg | 25 | Argon | 1088 | 10 | Mass | 5 mm square | Lead | 420 |
| | 1-14 | Mg | 28 | Argon | 1060 | 1 | Mass | 5 mm square | Bismuth | 520 |
| | 1-15 | Mg | 32 | Nitrogen | 1067 | 32 | Mass | 5 mm square | Bismuth | 550 |
| | 1-16 | Mg | 33 | Nitrogen | 1083 | 49 | Mass | 5 mm square | Bismuth | 580 |
| Comparative example | 1-1 | Mg | 55 | Argon | 1087 | 200 | Tape | 1 mm | Bismuth | 500 |
| | 1-2 | — | — | — | — | — | — | — | — | — |
| | 1-3 | — | — | — | — | — | — | — | — | — |

(Evaluation)
(Observation of Particle Shape)

Figure 11:
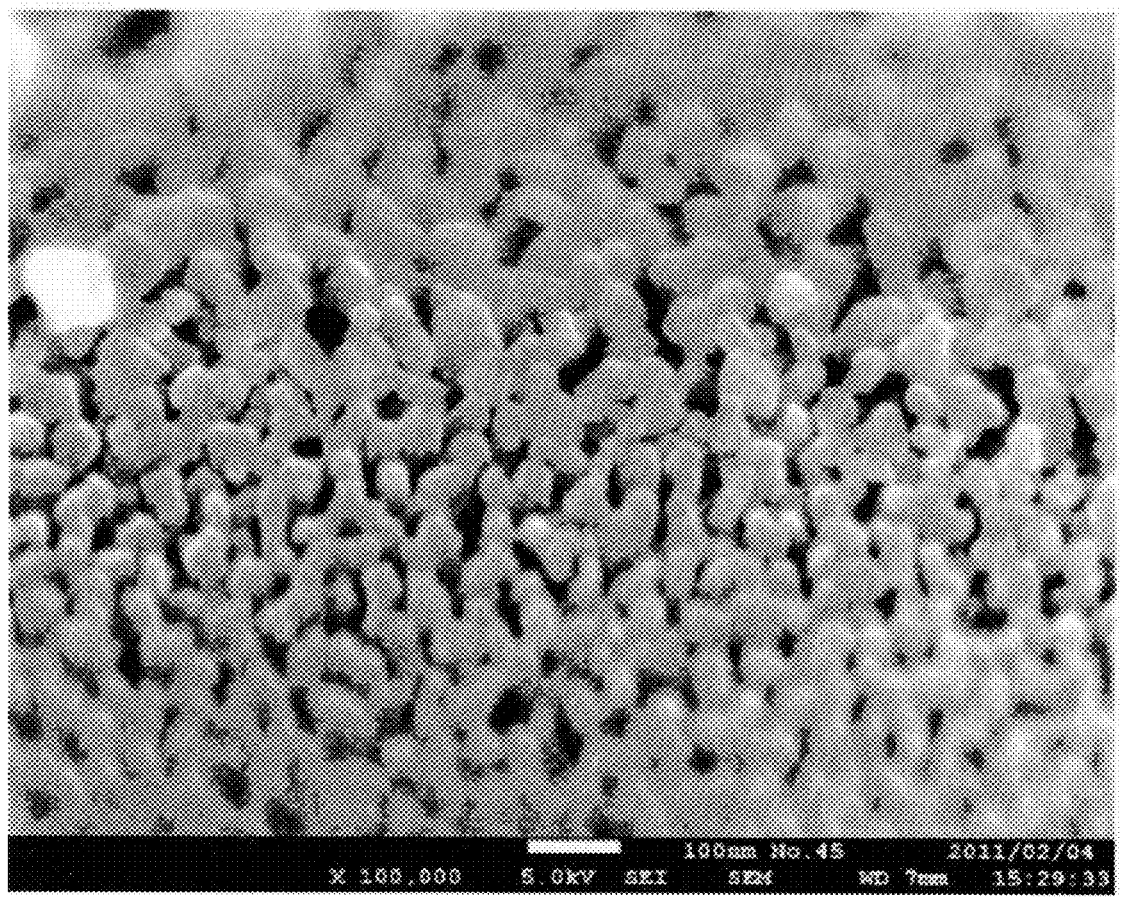
FIG. 11: an SEM picture of the surface of the porous silicon particle of example 1-12.
Figure 12:
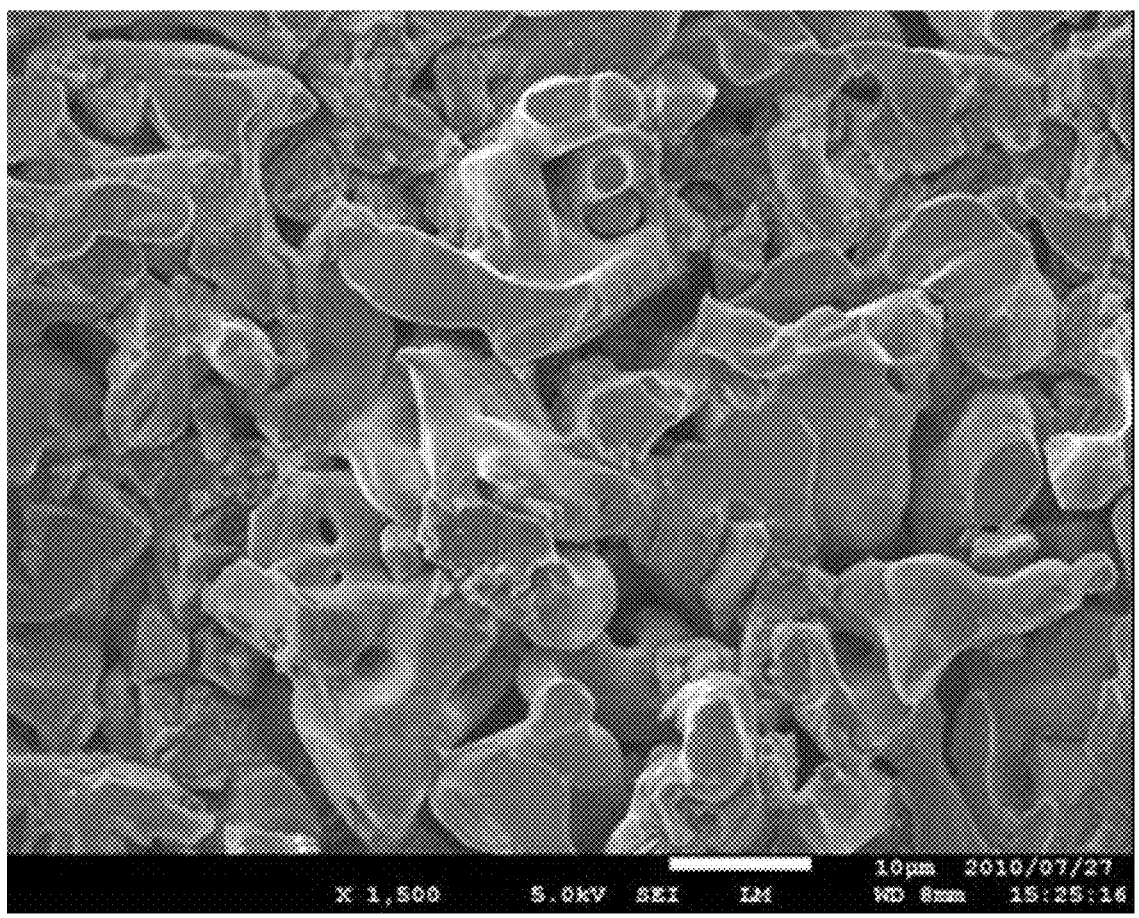
FIG. 12: an SEM picture of the porous silicon particle of comparative example 1-1.

Observation of the particle shape of a porous silicon particle was performed using the scanning transmission electron microscope (JEM3100FEF, by JEOL). The SEM picture of the particles of example 1-12 is shown in FIG. 11, and the SEM picture of the particles of comparative example 1-1 is shown in FIG. 12. In FIG. 11, it is observed that silicon microparticles with particle diameter of 20 nm to 100 nm flock and join mutually, and form the porous silicon particle. On the other hand, in FIG. 12, the structure of the shape of a wall about 5 micrometers thick is observed.

The average particle diameter of the silicon microparticle was measured by the picture information of an electron microscope (SEM). The porous silicon particle was divided into a particle interior domain of less than 50% of a radial direction and a surface neighborhood domain of more than 50% of a radial direction, and the ratio of average particle diameters Ds and Di was calculated. Although the value of Ds/Di was all between 0.5 and 1.5 in the examples, in comparative example 1-2 acquired with the etching method, the average particle diameter of the microparticles of a surface neighborhood domain was small compared with the particle interior domain, and the value of Ds/Di became small.

Si concentration of a silicon microparticle and a porous silicon particle was measured by an electron beam micro analyzer (EPMA) or an energy dispersion type X-ray analysis (EDX). All particles contain 80 atomic % or more of silicon.

The average porosity of the porous silicon particle was measured using 15 mL cell by the mercury press-in method (JIS R 1655).

The porous silicon particle was divided into a particle interior domain of less than 50% in a radial direction and a surface neighborhood domain of more than 50% in a radial direction, Xs and Xi that are average porosities of each were measured by the picture information of SEM, and the ratio of Xs to Xi was calculated. Although the value of Xs/Xi was between 0.5 to 1.5 in the example, since the pore structure of the surface neighborhood domain was grown compared with the particle interior domain, in comparative example 1-2 acquired by the etching method, Xs/Xi became large.

Figure 13:
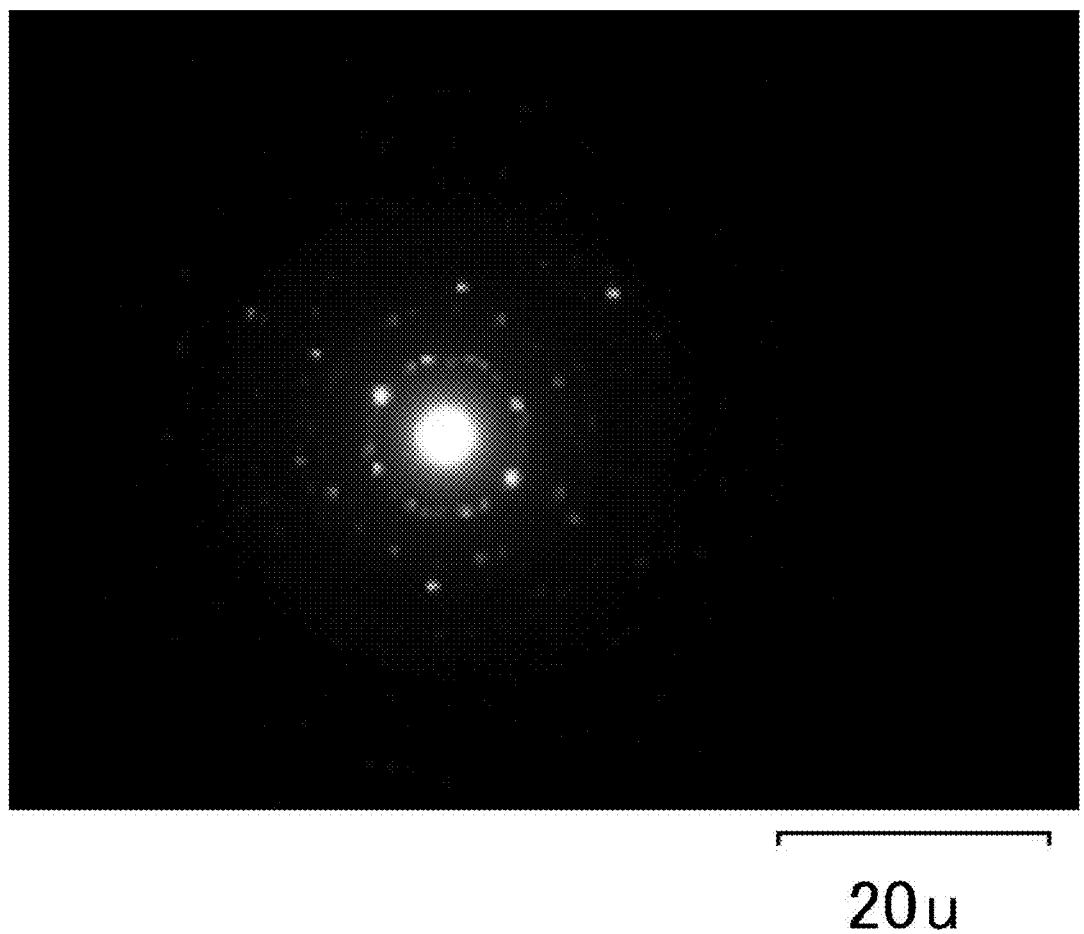
FIG. 13: an X-ray diffraction lattice image of the porous silicon particle of example 1-12.

FIG. 13 shows the X-ray diffraction lattice image of the silicon microparticle which forms the porous silicon particle of example 1-12. Since diffraction of the crystal originated from silicon is observed and spot type diffraction is obtained, it means that the silicon microparticle comprises single crystal silicon.

(Evaluation of the Cycling Characteristics of Particles for a Negative Electrode)
(i) Preparation of Negative Electrode Slurry 65 mass parts of particles of an example or a comparative example and 20 mass parts of acetylene black (by DENKI KAGAKU KOGYO K.K.) were supplied to the mixer.

Furthermore, 5 mass parts by solid content conversion ratio of the emulsion of styrene butadiene rubber (SBR) of 5 mass % (BM400B, by Nippon Zeon) as a binder, 10 mass parts by solid content conversion ratio of 1 mass % solution of carboxymethylcellulose sodium (by Daicel Chemical Industries) as a thickener which adjusts the viscosity of slurry were mixed and the slurry was produced.

(ii) Production of a Negative Electrode

The prepared slurry was applied by a thickness of 10 micrometers using the automatic coating apparatus on 10 micrometer-thick electrolysis copper foil for current collectors (NC-WS, by Furukawa Electric), and after making it is dried at 70 degrees Celsius, the negative electrode for lithium-ion batteries was manufactured through the thickness adjusting process by a press.

(iii) Characteristic Evaluation

The negative electrode for lithium-ion batteries was cut out to 20 mm-diameter, metal Li was used for the opposite electrode and a reference electrode, the electrolysis solution consisting of the mixed solution of ethylene carbonate and diethyl carbonate containing $LiPF_6$ of 1 mol/L was poured in, and the electrochemical examination cell was formed. The assembly of an electrochemical examination cell was performed within the glove box not more than dew point −60 degrees Celsius. Evaluation of the charge-and-discharge characteristic was performed by measuring first-time electric discharge capacity and the electric discharge capacity after charge/discharge of 50 cycles, and by calculating the discharge capacity retention. Discharge capacity was calculated on the basis of the gross weight of active material Si effective in the occlusion and discharge of lithium. First, the cell was charged on the constant current conditions of 0.1 C in the current value under 25 degrees Celsius environment. Charge was suspended when the voltage value fell to 0.02V (the oxidation-reduction potential of Li/Li+ reference electrode is 0V standard, the same shall apply hereafter). Subsequently, on the conditions of current value 0.1 C, it discharged until the voltage to a reference electrode was set to 1.5V, and the initial discharge capacity of 0.1 C was measured. It is noted that 0.1 C is a current value which can charge fully in 10 hours. Subsequently, the above-mentioned charge and discharge at the charge-and-discharge speed in 0.1 C repeated 50 cycles.

The ratio of the discharge capacity after 50 cycles of charge and discharge to the initial discharge capacity was calculated in percentage and it is the discharge capacity retention after 50 cycles.

The evaluation result was summarized in Table 4. From example 1-13 to 1-16, since the silicon particles were large, the particles which were ground by the mortar and made small were used for characteristic evaluation. For example, 130->33 of the diameter of a particle of the porous silicon particle of example 1-13 means the porous silicon particle which was 130 micrometers of mean particle sizes was ground and the porous silicon particle of 33 micrometers of mean particle sizes was obtained.

tion path and the electrode function were lost is increased, it is thought that the life of the cell become short.

In comparative example 1-2, since pore structure was formed by etching by fluoric acid or nitric acid, the spot without pores was formed in the particle center. The portion of this core cannot follow the volume change by charge and discharge, and it is considered that cycling characteristics are bad.

According to comparative example 1-3, since a simple silicon particle without pore structure cannot follow the volume change by charge and discharge, and it is considered that cycling characteristics are bad.

TABLE 4

| | | Silicon microparticle | | | Silicon particles | | | | Cell characteristic | | |
|---|---|---|---|---|---|---|---|---|---|---|---|
| | | Intermediate alloy element | Si concentration [at %] | Average particle diameter [nm] | Average diameter ratio of microparticles Ds/Di | Si concentration [at %] | Average particle diameter [μm] | Average Porosity [%] | Porosity ratio Xs/Xi | Initial discharge capacity [mAhg$^{-1}$] | Discharge capacity after 50 cycles [mAhg$^{-1}$] | Capacity retention after 50 cycles [%] |
| Example | 1-1 | Co | 97 | 180 | 0.83 | 97 | 9 | 38 | 0.94 | 2260 | 1855 | 82 |
| | 1-2 | Cr | 82 | 170 | 0.99 | 82 | 11 | 49 | 0.98 | 2850 | 2060 | 72 |
| | 1-3 | Cu | 88 | 130 | 0.92 | 88 | 13 | 55 | 0.90 | 1885 | 1560 | 83 |
| | 1-4 | Fe | 98 | 160 | 1.08 | 98 | 21 | 40 | 1.00 | 2510 | 2155 | 86 |
| | 1-5 | Mg | 81 | 32 | 1.32 | 81 | 19 | 56 | 1.03 | 2305 | 2195 | 82 |
| | 1-6 | Mn | 99 | 190 | 1.35 | 99 | 55 | 33 | 1.40 | 2035 | 1640 | 81 |
| | 1-7 | Mo | 97 | 140 | 0.95 | 97 | 63 | 52 | 1.16 | 1950 | 1625 | 83 |
| | 1-8 | Ni | 88 | 180 | 0.91 | 88 | 44 | 22 | 1.09 | 2170 | 1530 | 71 |
| | 1-9 | P | 85 | 210 | 1.12 | 85 | 90 | 60 | 0.97 | 2490 | 1870 | 75 |
| | 1-10 | Ti | 81 | 220 | 0.99 | 81 | 71 | 40 | 0.78 | 2285 | 1650 | 72 |
| | 1-11 | Zr | 99 | 160 | 0.57 | 99 | 29 | 53 | 0.93 | 2040 | 1465 | 72 |
| | 1-12 | Mg | 93 | 80 | 1.40 | 93 | 19 | 71 | 1.01 | 2310 | 1995 | 79 |
| | 1-13 | Mg | 95 | 43 | 0.99 | 95 | 130->33 | 47 | 0.99 | 2260 | 2085 | 80 |
| | 1-14 | Mg | 99 | 160 | 0.62 | 99 | 320->21 | 45 | 1.19 | 2120 | 1950 | 77 |
| | 1-15 | Mg | 99 | 32 | 1.00 | 99 | 103->19 | 41 | 0.87 | 2390 | 2055 | 81 |
| | 1-16 | Mg | 94 | 25 | 1.00 | 94 | 98->13 | 35 | 0.78 | 2450 | 2180 | 83 |
| Comparative example | 1-1 | Mg | 95 | 860 | 1.05 | 95 | 35 | 38 | 1.08 | 1435 | 740 | 52 |
| | 1-2 | — | 99 | 5 | 0.13 | 99 | 4 | 23 | 4.5 | 1215 | 550 | 45 |
| | 1-3 | — | 99 | 5 μm | 1.0 | 99 | 5 | — | 1.0 | 880 | 230 | 26 |

As shown in the table, since each example has capacity retention after 50 cycles is higher and the ratio of a fall of the discharge capacity by repeat of charge and discharge is smaller than comparative example 1-1 to 1-3, a long life time of the cell is expected.

In each example, since a negative electrode active material is a porous silicon particle with the three-dimensional network structure, even if volume change of the expansion and contraction by alloying and dealloying of Li and Si at the time of charge and discharge causes, a crack or pulverization of silicon particles are not caused but discharge capacity retention is high.

When compared in detail, in comparative example 1-1, pure Si crystallized as a primary crystal at the time of intermediate alloy production, and also eutectic structure (Si and Mg$_2$Si) generated in the solidification last stage. This primary crystal Si was as coarse as about 10 micrometers. Even if this is immersed in a bismuth molten metal, it does not become minute, but was conversely made coarse, and even if it passed through the etching process, it remained in the form as it is. Therefore, when repeating intrusion and release of Li, Si simple substances including coarse Si cause a crack and collapse, without following charge-and-discharge (volume change through the expansion and contraction by alloying and dealloying of Li and Si. The ratio that the current collec- Hereafter, example 2 about the complex porous silicon particle containing a composite element is described.

Example 2

Example 2-1

Silicon powder (lump shape, purity: more than 95.0%), iron powder (granule: 2 mm, purity: more than 99.999%), and magnesium powder (powder, purity: more than 98.0%) were blended at a ratio of Si:Fe:Mg=25:5:70 (atomic %), and this was melted at 1120 degrees Celsius in argon atmosphere. Then, it cooled rapidly by cooling-rate of 800K/s using the single roll casting machine, and the ribbon made of a silicon alloy which has thickness of 40 micrometers was produced. This was immersed in the bismuth molten metal of 500 degrees Celsius for 1 minute, immediately it was cooled rapidly with argon gas. By this process, the complex of the 2nd phase that consists of a silicon microparticle and silicon compound particles which consist of a Si—Fe alloy and Mg—Bi alloy or Bi was obtained. This complex was immersed in 20% nitric acid solution for 5 minutes, and the complex porous silicon particle was obtained.

Examples 2-2 to 2-8, 2-10, 2-11

The manufacturing conditions of each example and a comparative example were summarized in Table 5. In examples 2-2 to 2-8, 2-10, and 2-11, the complex porous silicon was obtained through manufacturing conditions shown in Table 5, such as a compounding ratio of an intermediate alloy element, composite element and each element, and other conditions are similar to the method of example 2-1. In example 2-4, since the silicon alloy of the continuous ribbon shape could not be formed but they break at 1 to 2 cm, they became a piece of foil-like silicon alloy. 100 micrometers diameter in the linear silicon intermediate alloy of example 2-5, means that the diameter of a line shape intermediate alloy is 100 micrometers. It is the same also in example 2-8

Example 2-9

Silicon powder, vanadium powder and phosphorus powder were blended at a ratio of Si:V:P=40:1:59 (atomic %) and was melted at 1439 degrees Celsius in argon atmosphere. Then, it was cooled rapidly by cooling-rate of 800K/s using the gas atomization apparatus, and the granular silicon alloy with an average particle diameter of 40 micrometers was produced. Immediately after making this immersed in a 750 degrees Celsius cadmium molten metal for 1 minute, it was cooled rapidly with argon gas. By this process, the complex of silicon microparticles, silicon compound particles that consist of an alloy of Si and V and the 2nd phase that consists of P—Cd alloy or Cd was obtained. This complex was immersed in 20% nitric acid solution for 5 minutes, and the complex porous silicon particle was obtained. 40 micrometer-diameter in a granular intermediate alloy means that the average particle diameter of a granular intermediate alloy is 40 micrometers.

Example 2-12

Silicon and magnesium powder were blended at a ratio of Si:Mg=31:69 (atomic %), and this was melted in argon atmosphere. Then, it was cooled within the mold and the ingot made of a silicon alloy of the size of a 5-mm square was produced. This was immersed in the bismuth molten metal containing arsenic of 1 atomic % for 1 minute, immediately it was cooled rapidly with argon gas. Through this process, the complex of silicon microparticles, silicon compound particles that consist of Si—As alloy and the 2nd phase that consist of Mg—Bi alloy or Bi was obtained. This complex was immersed in 20% nitric acid solution for 50 minutes, and the complex porous silicon particle was obtained.

Example 2-13 to 2-16

In examples 2-13 to 2-16, complex porous silicon particles were obtained through manufacturing conditions shown in Table 5, such as a compounding ratio of an intermediate alloy element and each element, and other conditions are similar to the method of example 1-12. In example 2-13, 2-15, and 2-16, cooling rate were raised using the water cooling block.

TABLE 5

| | | Composition | | | | Intermediate alloy manufacture Melting casting conditions | | | Ribbon thickness, line diameter, granule diameter, or lump size |
|---|---|---|---|---|---|---|---|---|---|
| | | Intermediate alloy element | Si content [at %] | Composite element | | Melting atmosphere | Melting temperature [° C.] | Cooling rate [K/s] | Shape |
| | | | | Element name | Content [at %] | | | | |
| Example | 2-1 | Mg | 25 | Fe | 5 | Argon | 1120 | 800 | Ribbon | 40 μm |
| | 2-2 | Co | 55 | Ba | 9 | Vacuum | 1473 | 800 | Ribbon | 200 μm |
| | 2-3 | Cr | 47 | Fe | 3 | Vacuum | 1607 | 800 | Ribbon | 500 μm |
| | 2-4 | Cu | 27 | Mn | 5 | Vacuum | 894 | 200 | Piece of foil | 30 μm |
| | 2-5 | Fe | 30 | Mg | 4 | Vacuum | 1397 | 190 | Line | 100 μm dia. |
| | 2-6 | Mn | 52 | Nd | 12 | Vacuum | 1276 | 300 | Ribbon | 60 μm |
| | 2-7 | Mo | 55 | Te | 6 | Vacuum | 1904 | 800 | Ribbon | 150 μm |
| | 2-8 | Ni | 50 | Te | 8 | Vacuum | 994 | 200 | Line | 300 μm dia. |
| | 2-9 | P | 40 | V | 1 | Argon | 1439 | 800 | Granule | 40 μm dia. |
| | 2-10 | Ti | 61 | Yb | 13 | Vacuum | 1740 | 400 | Ribbon | 120 μm |
| | 2-11 | Zr | 57 | As | 10 | Vacuum | 2262 | 500 | Ribbon | 600 μm |
| | 2-12 | Mg | 31 | — | — | Argon | 1125 | 2 | Lump | 5 mm square |
| | 2-13 | Mg | 32 | — | — | Argon | 1128 | 10 | Lump | 5 mm square |
| | 2-14 | Mg | 29 | — | — | Argon | 1100 | 1 | Lump | 5 mm square |
| | 2-15 | Mg | 26 | — | — | Argon | 1105 | 32 | Lump | 5 mm square |
| | 2-16 | Mg | 24 | — | — | Argon | 1090 | 49 | Lump | 5 mm square |
| Comparative example | 2-1 | Mg | 55 | Fe | 1 | Argon | 1195 | 1 | Lump | 5 mm square |
| | 2-2 | Mg | 25 | Fe | 11 | Argon | 1105 | 1 | Lump | 5 mm square |
| | 2-3 | Mg | 24 | — | — | Argon | 1095 | 41 | Lump | 5 mm square |
| | 2-4 | — | 90 | Fe | 10 | Argon | 1390 | 110 | Piece of foil | 40 μm |
| | 2-5 | — | — | — | — | — | — | — | — | — |

| | | Melting metal immersion bath | | | | |
|---|---|---|---|---|---|---|
| | | Molten metal element | | Addition element | | Molten metal temperature [° C.] |
| | | Element name | Concentration [at %] | Element name | Concentration [at %] | |
| Example | 2-1 | Bismuth | 99.99 | — | — | 500 |
| | 2-2 | Tin | 99.9 | — | — | 940 |
| | 2-3 | Antimony | 99.8 | — | — | 1120 |

TABLE 5-continued

| | | | | | | |
|---|---|---|---|---|---|---|
| | | 2-4 | Zinc | 99.9 | — | — | 500 |
| | | 2-5 | Antimony | 99.8 | — | — | 1120 |
| | | 2-6 | Indium | 99.9 | — | — | 920 |
| | | 2-7 | Gallium | 99.99 | — | — | 1350 |
| | | 2-8 | Tin | 99.9 | — | — | 820 |
| | | 2-9 | Cadmium | 99.99 | — | — | 750 |
| | | 2-10 | Tin | 99.9 | — | — | 1360 |
| | | 2-11 | Bismuth | 99.99 | — | — | 1310 |
| | | 2-12 | Bismuth | 99 | As | 1 | 690 |
| | | 2-13 | Bismuth | 98 | Ni | 2 | 550 |
| | | 2-14 | Bismuth | 96 | Ca | 4 | 580 |
| | | 2-15 | Bismuth | 95 | Ti | 5 | 620 |
| | | 2-16 | Bismuth | 91 | Ni | 9 | 650 |
| Comparative example | | 2-1 | Bismuth | 99.99 | — | — | 500 |
| | | 2-2 | Bismuth | 99.99 | — | — | 500 |
| | | 2-3 | Bismuth | 85 | Ni | 15 | 650 |
| | | 2-4 | — | — | — | — | — |
| | | 2-5 | — | — | — | — | — |

Comparative Example 2-1

Silicon powder, iron powder and magnesium powder were blended at a ratio of Si:Fe:Mg=55:1:44 (atomic %) and this was melted at 1195 degrees Celsius in a vacuum furnace. Then, it was cast using the copper block and blocks made of a silicon alloy of a 5-mm square were produced by cooling-rate of 1K/s. These were immersed in the bismuth molten metal of 500 degrees Celsius for 10 minutes, immediately they were cooled rapidly with argon gas. This 2 phase complex was immersed in 20% nitric acid solution for 50 minutes. This comparative example does not satisfy a/(a+Y)×100≤[Si maximum content] of a formula (2).

Comparative Example 2-2

Silicon powder, iron powder and magnesium powder were blended at a ratio of Si:Fe:Mg=25:11:64 (atomic %) and this was melted at 1105 degrees Celsius in a vacuum furnace. Then, it was cast using the copper block and blocks made of a silicon alloy of a 5-mm square were produced by cooling-rate of 1K/s. These were immersed in the bismuth molten metal of 500 degrees Celsius for 10 minutes, immediately they were cooled rapidly with argon gas. This 2 phase complex was immersed in 20% nitric acid solution for 50 minutes. This comparative example does not satisfy 10≤a/(a+Y)×100 of a formula (2).

Comparative Example 2-3

Silicon powder and magnesium powder were blended at a ratio of Si:Mg=24:76 (atomic %), and this was melted at 1095 degrees Celsius in argon atmosphere. Then, it was cast using the water-cooled copper block, and blocks made of a silicon alloy of a 5-mm square were produced by cooling-rate of 41K/s. These were immersed in the alloy bath of 500 degrees Celsius of bismuth of 85 atomic % and nickel of 15 atomic % for 10 minutes, and immediately they were cooled rapidly with argon gas. This 2 phase complex was immersed in 20% nitric acid solution for 50 minutes. The concentration of the independent composite element in the alloy bath of this comparative example is over 10 atomic %.

Comparative Example 2-4

Silicon powder and iron powder were blended at a ratio of Si:Fe=90:10 (atomic %) and this was melted at 1390 degrees Celsius in a vacuum furnace. Then, it was cooled rapidly by cooling rate of 110K/s using the single roll casting machine, and pieces of foil made of silicon alloy were produced. These were immersed in fluoric and nitric acid for 10 minutes and washed.

Comparative Example 2-5

Silicon powder and iron powder were blended at a ratio of Si:Fe=66:34 (atomic %) and this was melted at 1250 degrees Celsius in a vacuum furnace. Then, it was rapidly solidified using the gas atomization apparatus and the $FeSi_2$ intermetallic compound was produced. This was screened and the particles of 1 to 10 micrometers of grain size distribution were collected. This particle and a silicon particle (SIE23PB, by Kojundo Chemical Laboratory) with an average particle diameter of 5 micrometers were mixed by 2:1, and it is granulated, using styrene butadiene rubber (SBR) as a binder.

[Evaluation]

Figure 14:
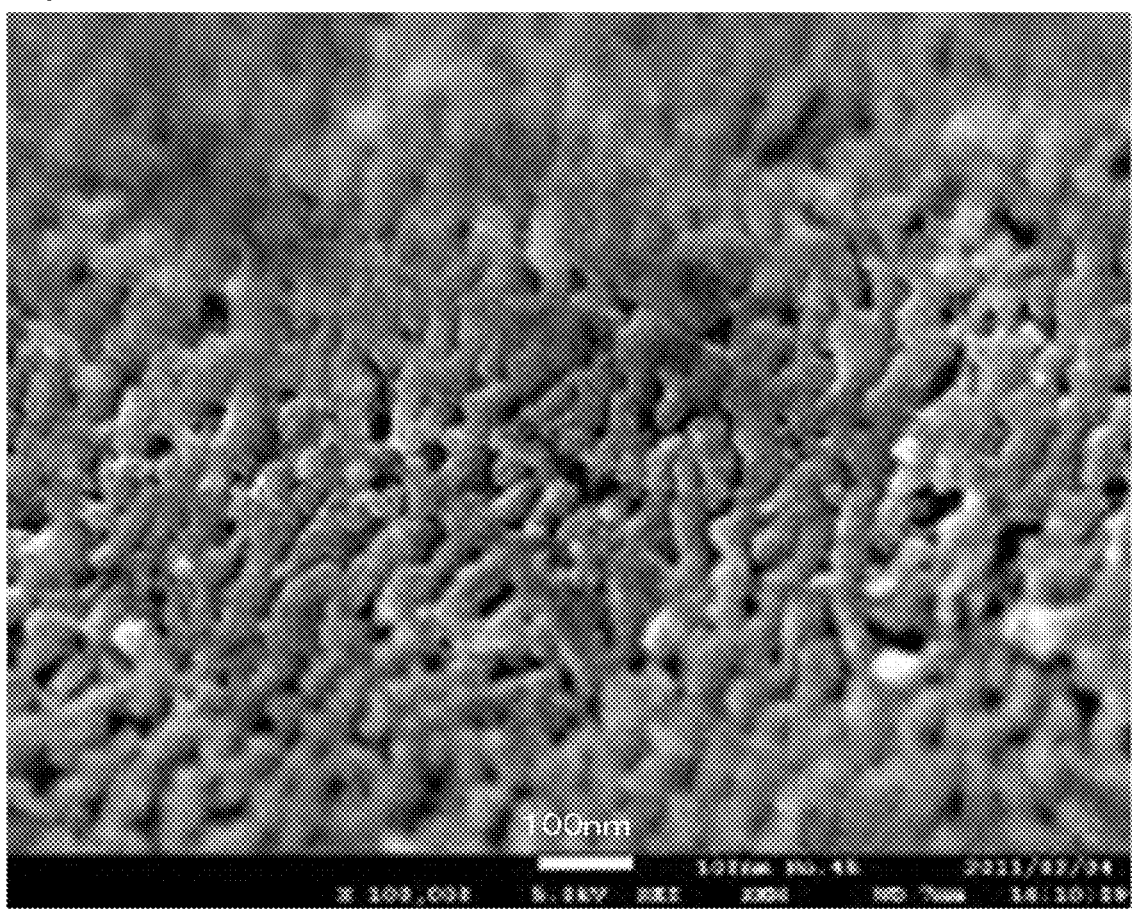
FIG. 14: an SEM picture of the surface of the complex porous silicon particle of example 2-1.
Figure 15:
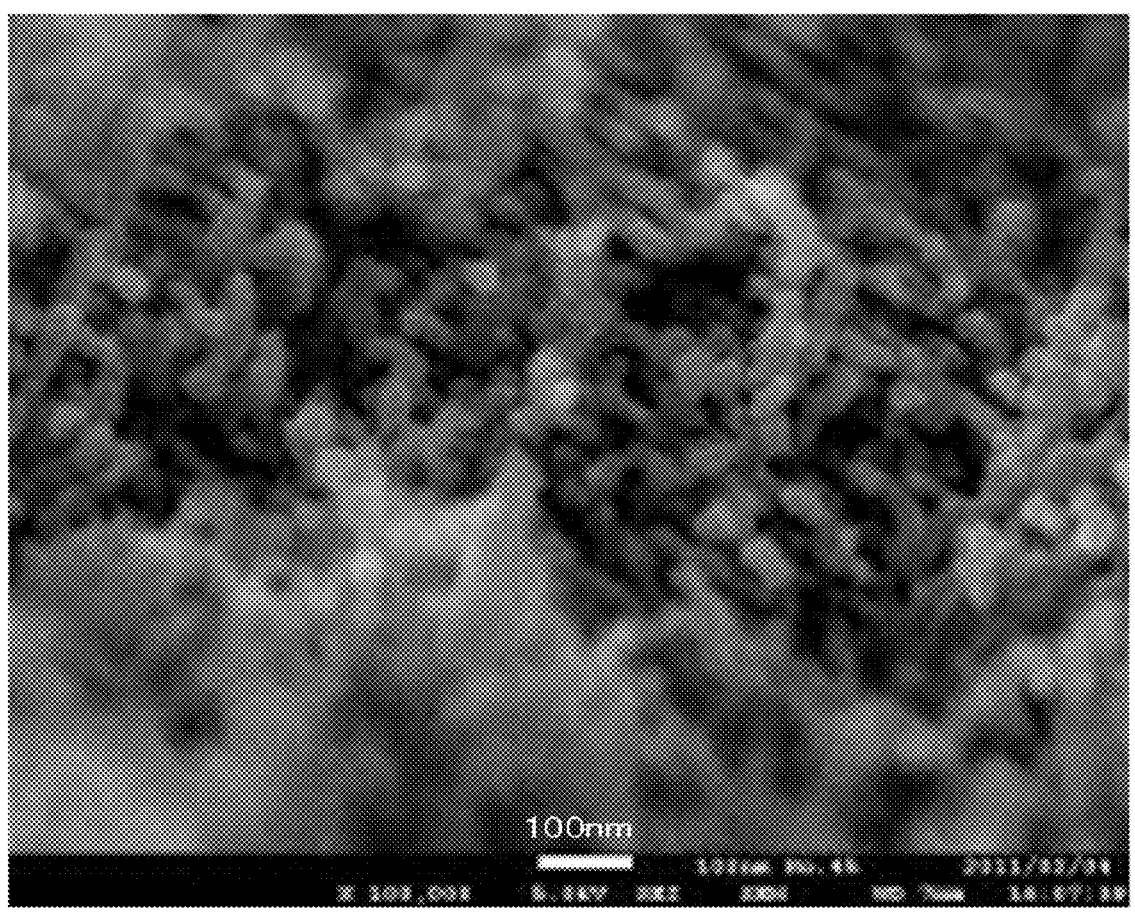
FIG. 15: an SEM picture of the section inside the complex porous silicon particle of example 2-1.
Figure 16:
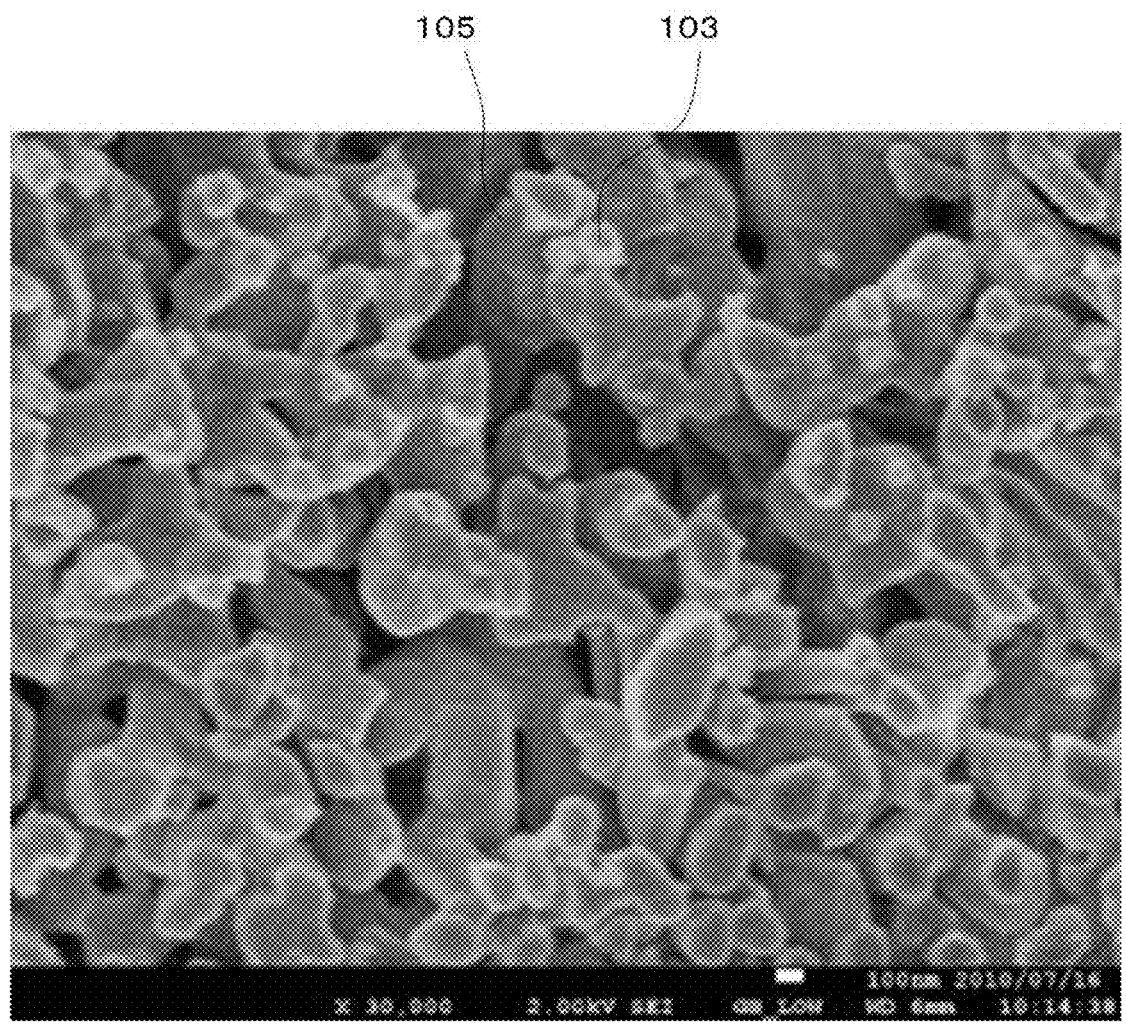
FIG. 16: an SEM picture of the surface of the complex porous silicon particle of example 2-1.

Observation of the particle shape of a complex porous silicon particle was performed using a scanning transmission electron microscope (JEM3100FEF, by JEOL). An SEM picture of the surface of the particles concerning example 2-1 is shown in FIG. 14, an SEM picture of the section inside the particles concerning example 2-1 is shown in FIG. 15, and an SEM picture of a surface of the particles concerning example 2-1 is shown in FIG. 16. In FIGS. 14 and 15, it is observed that silicon microparticles of particle diameter of 20 nm to 50 nm flock and join mutually, and form the complex porous silicon particle. It is observed that there is no big difference in the particle diameter of porosity or a silicon microparticle in FIG. 14 and FIG. 15. In FIG. 16, small silicon particles joining to silicide's big particles are observed.

Figure 17:
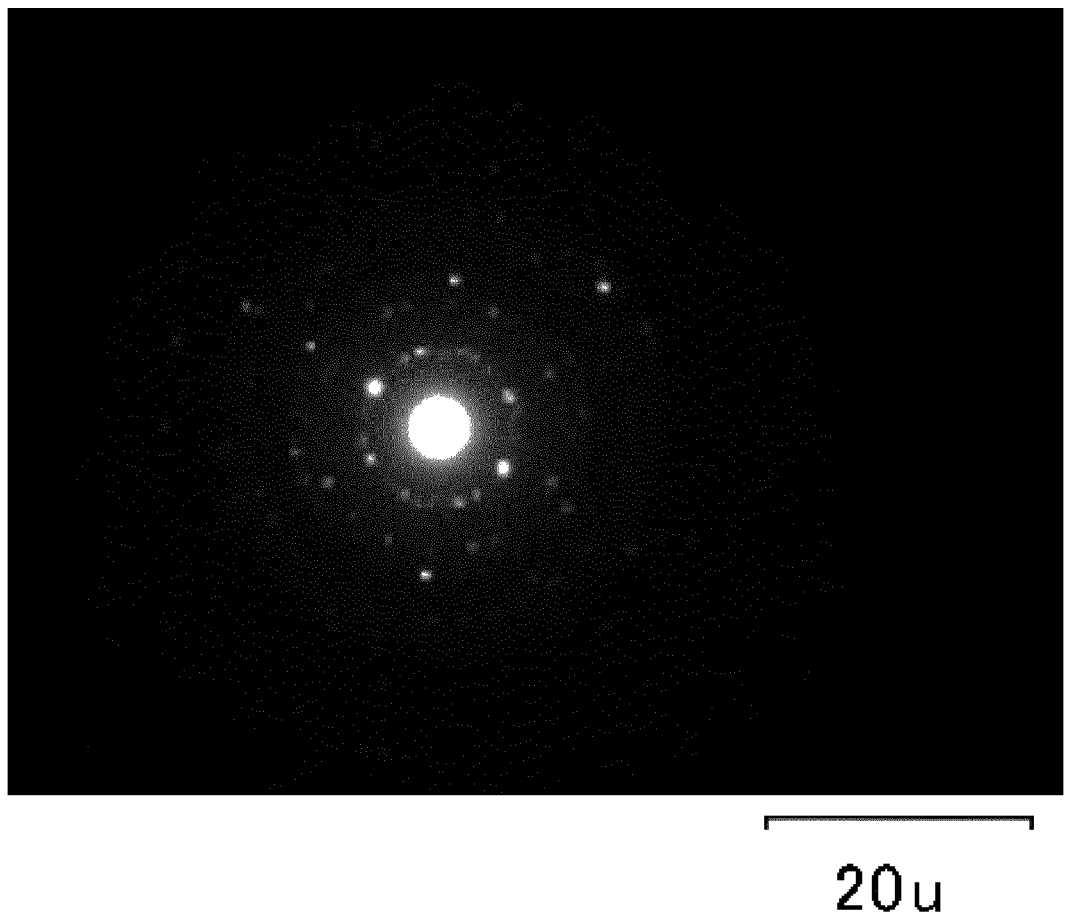
FIG. 17: an X-ray diffraction lattice image of the silicon microparticles of the complex porous silicon particle concerning example 2-1.

FIG. 17 shows the X-ray diffraction lattice image of the silicon microparticle which forms silicon complex particles. The spot of crystal originated from silicon is observed and it turns out that a silicon microparticle is a single crystal.

Figure 18:
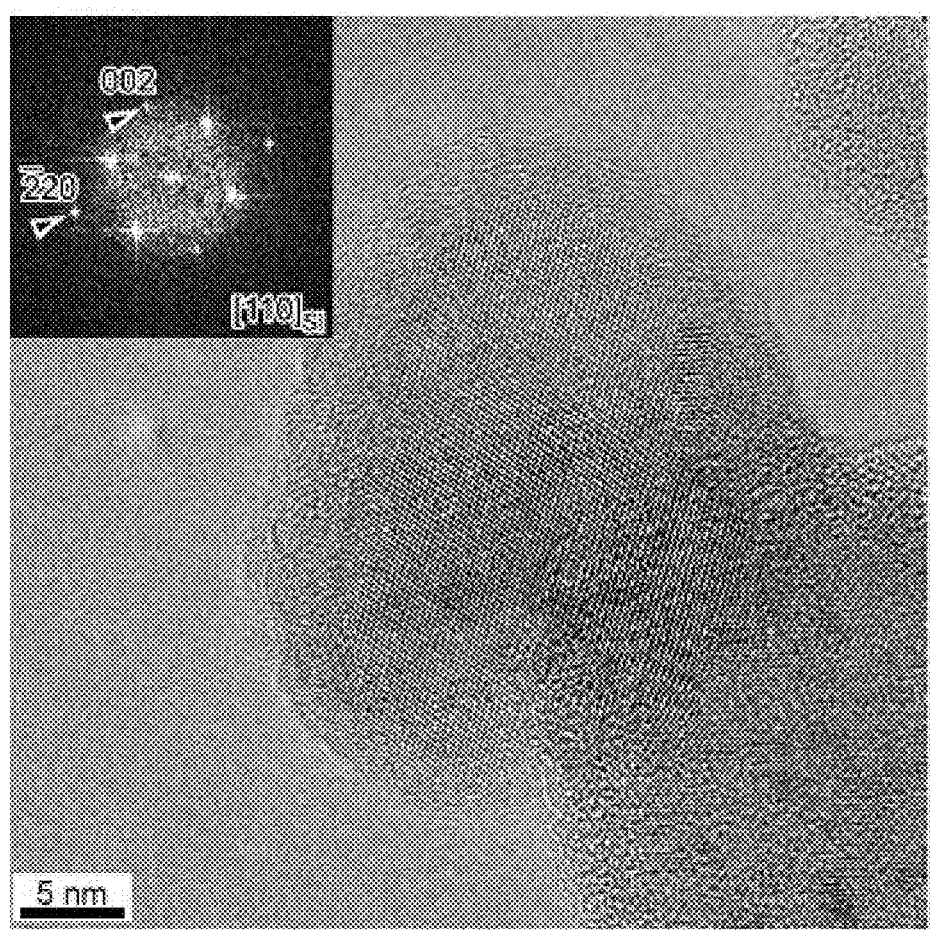
FIG. 18: a TEM picture of the silicon microparticles of the complex porous silicon particle of example 2-1, and a restriction view electron diffraction image (upper left).

FIG. 18 shows a TEM picture of a silicon microparticle which forms silicon complex particles. The upper left is a restricted view electron diffraction image in an observation region in the TEM. In the TEM picture, there is no grain boundary in one silicon microparticle, and it turns out that it is a single crystal. In a restricted view electron diffraction image, spots of crystal originated from silicon are observed and it means that a silicon microparticle is a single crystal.

Average particle diameters of the silicon microparticle and silicon compound particle were measured by the picture information of an electron microscope (SEM). The complex porous silicon particle was divided into a particle interior domain less than 50% of a radial direction and a surface neighborhood domain more than 50% of a radial direction, average particle diameters Ds and Di of each domain are measured from each SEM picture and the ratio was calculated. Although the values of Ds/Di were between 0.5 and 1.5 in all examples, in comparative example 2-4 acquired through the etching method, the average particle diameter of the microparticles of the surface neighborhood domain was small compared with the particle interior domain, and the value of Ds/Di became small. The method of using both above-mentioned DLS and observation of SEM was used to measure the average particle diameter of a complex porous silicon particle.

Si concentration of a silicon microparticle, the concentration of Si and a composite element etc. of a complex porous silicon particle were measured using ICP emission spectrophotometer. Also in every example, a silicon microparticle contains 80 atomic % or more of silicon.

The average porosity of the complex porous silicon particle was measured using 15 mL cell by the mercury press-in method (JIS R 1655).

The complex porous silicon particle was divided into a particle interior domain less than 50% of a radial direction and a surface neighborhood domain more than 50% of a radial direction, and the arbitrary spots in each domain were observed with the surface scanning electron microscope. Average porosities Xs and Xi of each domain were measured, and the ratio of Xs to Xi was calculated. Although the value of Xs/Xi was between 0.5 to 1.5 in the all examples, since the pore structure of the surface neighborhood domain was grown compared with the particle interior domain, in comparative example 2-4 acquired by the etching method, Xs/Xi became large.

(Evaluation of the Cycling Characteristics of Particles for a Negative Electrode)

(i) Preparation of Negative Electrode Slurry

Silicon particles were ground to rough particles by grinding treatment, and porous particle of 1 to 20 micrometers were fabricated by granulating them. 65 mass parts of particles of an example or a comparative example and 20 mass parts of acetylene black (by DENKI KAGAKU KOGYO K.K.) were supplied to the mixer. Furthermore, 5 mass parts by solid content conversion ratio of the emulsion of styrene butadiene rubber (SBR) of 5 mass % (BM400B, by Nippon Zeon) as a binder, 10 mass parts by a solid content conversion ratio of 1 mass % solution of carboxymethylcellulose sodium (by Daicel Chemical Industries) as a thickener which adjusts the viscosity of slurry were mixed and the slurry was produced.

(ii) Production of a Negative Electrode

The prepared slurry was applied by a thickness of 10 micrometers using the automatic coating apparatus on 10 micrometer-thick electrolysis copper foil for current collectors (NC-WS, by Furukawa Electric), and after making it is dried at 70 degrees Celsius, the negative electrode for lithium-ion batteries was manufactured through the thickness adjusting process by a press.

(iii) Characteristic Evaluation

The negative electrode for lithium-ion batteries was cut out to 20 mm diameter, metal Li was used for the opposite electrode and a reference electrode, the electrolysis solution consisting of the mixed solution of ethylene carbonate and diethyl carbonate containing $LiPF_6$ of 1 mol/L was poured in, and the electrochemical examination cell was formed. The assembly of an electrochemical examination cell was performed within the glove box not more than dew point −60 degrees Celsius. Evaluation of the charge-and-discharge characteristic was performed by measuring first-time electric discharge capacity and the electric discharge capacity after charge/discharge of 50 cycles, and by calculating the discharge capacity retention. Discharge capacity was calculated on the basis of the gross weight of active material Si and silicide that are usable in the occlusion and discharge of lithium. First, the cell was charged on the constant current conditions of 0.1 C under 25 degrees Celsius environment and the charge was suspended when the voltage value fell to 0.02V (the oxidation-reduction potential of Li/Li+ reference electrode is 0V standard, the same shall apply hereafter). Subsequently, on the conditions of current value of 0.1 C, it discharged until the voltage to a reference electrode became 1.5V, and the initial discharge capacity of 0.1 C was measured. It is noted that 0.1 C is a current value which can charge fully in 10 hours. Subsequently, the above-mentioned charge and discharge at the charge-and-discharge speed in 0.1 C repeated 50 cycles. The ratio of the discharge capacity after 50 cycles of charge and discharge to the initial discharge capacity was calculated in percentage and it is the discharge capacity retention after 50 cycles.

The evaluation result was summarized in Table 6. In examples 2-13 to 2-16 and comparative example 2-3, since the silicon particles were large, the particles that were ground by the mortar were used for characteristic evaluation. For example, 130->33 of example 2-13 means that the porous silicon particle with an average particle diameter of 130 micrometers was ground and the porous silicon particle with an average particle diameter of 33 micrometers was obtained.

TABLE 6

| | | | Silicon microparticle | | | Silicon compound particles | | Complex porous silicon particle | |
| --- | --- | --- | --- | --- | --- | --- | --- | --- | --- |
| | | Intermediate alloy element | Si concentration [at %] | Average particle diameter [nm] | Average particle diameter ratio of microparticles Ds/Di | Structure | Average particle diameter [μm] | The sum of Si and composite element [at %] | Average particle diameter [μm] |
| Example | 2-1 | Mg | 81 | 32 | 1.32 | Si x Fe y | 1.3 | 94 | 19 |
| | 2-2 | Co | 97 | 180 | 0.83 | Si x Ba y | 1.8 | 99 | 9 |
| | 2-3 | Cr | 82 | 170 | 0.99 | Si x Fe y | 1.8 | 95 | 11 |
| | 2-4 | Cu | 88 | 130 | 0.92 | Si x Mn y | 3.0 | 96 | 13 |
| | 2-5 | Fe | 98 | 160 | 1.08 | Si x Mg y | 1.5 | 99 | 21 |
| | 2-6 | Mn | 99 | 190 | 1.35 | Si x Nd y | 2.1 | 99 | 55 |
| | 2-7 | Mo | 97 | 140 | 0.95 | Si x Te y | 1.3 | 99 | 63 |

TABLE 6-continued

|  |  |  |  |  |  |  |  |  |  |
|---|---|---|---|---|---|---|---|---|---|
|  | 2-8 | Ni | 88 | 180 | 0.91 | Si x Te y | 1.2 | 96 | 44 |
|  | 2-9 | P | 85 | 210 | 1.12 | Si x V y | 2.4 | 94 | 90 |
|  | 2-10 | Ti | 81 | 220 | 0.99 | Si x Yb y | 1.9 | 93 | 71 |
|  | 2-11 | Zr | 99 | 160 | 0.57 | Si x As y | 1.8 | 99 | 29 |
|  | 2-12 | Mg | 93 | 80 | 1.40 | Si x As y | 0.1 | 98 | 19 |
|  | 2-13 | Mg | 95 | 43 | 0.99 | Si x Ni y | 4.0 | 99 | 130->33 |
|  | 2-14 | Mg | 99 | 160 | 0.62 | Si x Ca y | 5.5 | 99 | 320->21 |
|  | 2-15 | Mg | 99 | 32 | 1.00 | Si x Ti y | 7.3 | 99 | 103->19 |
|  | 2-16 | Mg | 94 | 25 | 1.00 | Si x Ni y | 9.1 | 98 | 98->13 |
| Comparative example | 2-1 | Mg | 95 | 860 | 1.05 | Si x Fe y | 20.1 | 99 | 35 |
|  | 2-2 | Mg | 99 | 5 | 0.13 | Si x Fe y | 23.0 | 99 | 32 |
|  | 2-3 | Mg | 94 | 25 | 1.00 | Si x Ni y | 21.0 | 98 | 98->41 |
|  | 2-4 | — | 99 | 15 | 0.11 | Si x Fe y | 3.5 | 99 | 35 |
|  | 2-5 | — | 99 | 5 μm | 1.0 | Si x Fe y | 5.0 | 33 | 15 |

| | | Complex porous silicon particle | | Cell characteristic | | |
|---|---|---|---|---|---|---|
| | | Average Porosity [%] | Porosity ratio Xs/Xi | Initial discharge capacity [mAhg$^{-1}$] | Discharge capacity after 50 cycles [mAhg$^{-1}$] | Capacity retention after 50 cycles [%] |
| Example | 2-1 | 56 | 1.03 | 2305 | 2195 | 95 |
| | 2-2 | 38 | 0.94 | 2260 | 1855 | 82 |
| | 2-3 | 49 | 0.98 | 2850 | 2060 | 72 |
| | 2-4 | 55 | 0.90 | 1885 | 1560 | 83 |
| | 2-5 | 40 | 1.00 | 2510 | 2155 | 86 |
| | 2-6 | 33 | 1.40 | 2035 | 1640 | 81 |
| | 2-7 | 52 | 1.16 | 1950 | 1625 | 83 |
| | 2-8 | 22 | 1.09 | 2170 | 1530 | 71 |
| | 2-9 | 60 | 0.97 | 2490 | 1870 | 75 |
| | 2-10 | 40 | 0.78 | 2285 | 1650 | 72 |
| | 2-11 | 53 | 0.93 | 2040 | 1465 | 72 |
| | 2-12 | 71 | 1.01 | 2310 | 1995 | 86 |
| | 2-13 | 47 | 0.99 | 2260 | 1990 | 88 |
| | 2-14 | 45 | 1.19 | 2120 | 1850 | 88 |
| | 2-15 | 41 | 0.87 | 2390 | 2055 | 86 |
| | 2-16 | 35 | 0.78 | 2450 | 2180 | 89 |
| Comparative example | 2-1 | 38 | 1.08 | 1860 | 640 | 34 |
| | 2-2 | 67 | 4.5 | 915 | 450 | 49 |
| | 2-3 | 35 | 0.78 | 1050 | 320 | 31 |
| | 2-4 | 43 | 23.10 | 2310 | 470 | 20 |
| | 2-5 | — | 1.2 | 1910 | 360 | 19 |

As shown in table, since each example has capacity retention after 50 cycles is higher and a ratio of a fall of the discharge capacity by repeat of charge and discharge is smaller than comparative examples, a long life time of cell is expected.

In each example, since a negative electrode active material is a complex porous silicon particle with three-dimensional network structure, even if volume change of the expansion and contraction by alloying and dealloying of Li and Si complex at the time of charge and discharge causes, a crack or pulverization of silicon particles are not caused but a discharge capacity retention is high.

When compared in detail, in comparative example 2-1, pure Si crystallized as a primary crystal at the time of intermediate alloy production, and also eutectic structure (Si and Mg$_2$Si) generated in the solidification last stage. This primary crystal Si was as coarse as about 10 micrometers. Even if this is immersed in a bismuth molten metal, it does not become minute, and even if it passed through the etching process, it remained in the form as it is. Therefore, when repeating intrusion and release of Li, Si simple substances including coarse Si cause a crack and collapse, without following charge-and-discharge (volume change through the expansion and contraction by alloying and dealloying of Li and Si). The ratio that the current collection path and the electrode function were lost is increased, it is thought that the life of the cell become short.

Since there was much quantity of iron which is a composite element compared with silicon and almost all silicon had formed silicide in comparative example 2-2, discharge capacity was small.

There was much quantity of Ni which is the composite element added to the immersed molten metal in comparative example 2-3, and since almost all silicon had formed silicide, discharge capacity was small.

In comparative example 2-4, since pore structure was formed by etching by fluoric acid or nitric acid, a domain without pores was formed in the particle center. The part of this core cannot follow the volume change by charge and discharge, and it is considered that cycling characteristics are bad.

According to comparative example 2-5, since a simple particle without pore structure cannot follow the volume change by charge and discharge, and it is considered that cycling characteristics are bad.

As mentioned above, although the suitable embodiment of the present invention was described referring to an accompanying drawing, the present invention is not limited to the mentioned examples. In the category of the technical idea indicated by this application, a person skilled in the art can think out for the various change examples or modified examples, and it will be understood that they naturally belong to the technical scope of the present invention.

INDUSTRIAL APPLICABILITY

The complex porous silicon particle to of the present invention can not only be used for a negative electrode of a lithium-ion battery, but can be used as a negative electrode of a lithium ion capacitor, a solar cell, a luminescent material, and a material for filters.

DESCRIPTION OF NOTATIONS

1: Porous silicon particle
3: Silicon microparticle
S: Surface neighborhood domain
I: Particle interior domain
7: Silicon intermediate alloy
9: The 2nd phase
11: Single roll casting machine
13: Silicon alloy
15: Crucible
17: Steel roll
19: Ribbon shape silicon intermediate alloy
21: Molten metal immersion apparatus
23: Molten metal
25: Sink roll
27: Support roll
31: Gas atomization apparatus
33: Crucible
35: Nozzle
36: Jet gas
37: Gas injection machine
38: Gas jet flow
39: Powdered silicon intermediate alloy
41: Rotation disk atomization apparatus
43: Crucible
45: Nozzle
49: Rotation disk
51: Powdered silicon intermediate alloy
53: Crucible
55: Mold
57: Lump silicon intermediate alloy
61: Molten metal immersion apparatus
63: Granular silicon intermediate alloy
65: Basket for immersion
67: Forcing cylinder
69: Molten metal
71: Molten metal immersion apparatus
73: Granular silicon intermediate alloy
75: Basket for immersion
77: Forcing cylinder
79: Molten metal
81: Mechanical stirrer
83: Gas blowing-in plug
101: Complex porous silicon particle
103: Silicon microparticle
105: Silicon compound particles
S: Surface neighborhood domain
I: Particle interior domain
107: Silicon intermediate alloy
109: The 2nd phase
111: Silicon intermediate alloy

The invention claimed is:

1. A porous silicon particle comprises two or more silicon microparticles that are joined together, wherein
an average particle diameter of said porous silicon particle is 0.1 micrometers to 1000 micrometers;
said porous silicon particle has a three-dimensional network structure having a continuous void;
an average porosity of said porous silicon particle is 15 to 93%;
Xs/Xi which is a ratio of a porosity Xs of a surface neighborhood domain of more than 50% of a radial direction to a porosity Xi of a particle interior domain of less than 50% of a radial direction is 0.5 to 1.5; and
silicon is included more than 80 atomic % in a ratio of elements except oxygen.

2. The porous silicon particle according to claim 1, wherein
an average particle diameter or an average pillar diameter of said silicon microparticles is 2 nm to 2 micrometers;
Ds/Di which is a ratio of average particle diameter Ds of said silicon microparticles in a surface neighborhood domain of more than 50% of a radial direction to an average particle diameter Di of said silicon microparticles in a particle interior domain of less than 50% of a radial direction is 0.5 to 1.5; and
said silicon microparticles are solid silicon microparticles that contain silicon of more than 80 atomic % in a ratio of elements except oxygen.

3. The porous silicon particle according to claim 1, wherein an area of a joint part between said silicon microparticles is 30% or less of a surface area of said silicon microparticles.

4. A complex porous silicon particle comprises two or more silicon microparticles and two or more silicon compound particles that are joined together, wherein
said silicon compound particles contain compound of silicon and one or more composite elements chosen from a group which consists of As, Ba, Ca, Ce, Co, Cr, Cu, Er, Fe, Gd, Hf, Lu, Mg, Mn, Mo, Nb, Nd, Ni, Os, Pr, Pt, Pu, Re, Rh, Ru, Sc, Sm, Sr, Ta, Te, Th, Ti, Tm, U, V, W, Y, Yb, and Zr;
an average particle diameter of said complex porous silicon particle is 0.1 micrometers to 1000 micrometers; and
a complex porous silicon particle has a three-dimensional network structure which consists of a continuous void.

5. The complex porous silicon particle according to claim 4, wherein
an average particle diameter or an average pillar diameter of said silicon microparticles is 2 nm to 2 micrometers; and
said silicon microparticles are solid silicon microparticles containing silicon of more than 80 atomic % in a ratio of elements except oxygen.

6. The complex porous silicon particle according to claim 4, wherein
an average particle diameter of said silicon compound particles is 50 nm to 50 micrometers; and
said silicon compound particles are particles of a solid silicon compound characterized by containing silicon of 50 to 90 atomic % in a ratio of elements except oxygen.

7. The complex porous silicon particle according to claim 4, wherein
Ds/Di which is a ratio of an average particle diameter Ds of said silicon microparticles in a surface neighborhood domain of more than 50% of a radial direction of said complex porous silicon particle to an average particle diameter Di of said silicon microparticles in a particle interior domain of less than 50% of a radial direction of said complex porous silicon particle is 0.5 to 1.5.

8. The complex porous silicon particle according to claim 4 wherein,
Xs/Xi which is a ratio of a porosity Xs of a surface neighborhood domain of more than 50% of a radial direction of said complex porous silicon particle to a porosity Xi of a particle interior domain of less than 50% of a radial direction of said complex porous silicon particle is 0.5 to 1.5.

9. The complex porous silicon particle according to claim 4, wherein the silicon compound particles are particles of a solid silicon compound containing silicon of 50 to 90 atomic % in a ratio of elements except oxygen.

* * * * *